(12) United States Patent
Shizuno et al.

(10) Patent No.: US 10,038,342 B2
(45) Date of Patent: Jul. 31, 2018

(54) POWER TRANSFER SYSTEM WITH SHIELDING BODY, POWER TRANSMITTING DEVICE WITH SHIELDING BODY, AND POWER TRANSFER METHOD FOR POWER TRANSMITTING SYSTEM

(71) Applicant: NEC Corporation, Minato-ku, Tokyo (JP)

(72) Inventors: Kaoru Shizuno, Tokyo (JP); Masahiro Tanomura, Tokyo (JP); Shuhei Yoshida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 315 days.

(21) Appl. No.: 14/890,210

(22) PCT Filed: May 15, 2014

(86) PCT No.: PCT/JP2014/062951
§ 371 (c)(1),
(2) Date: Nov. 10, 2015

(87) PCT Pub. No.: WO2014/185490
PCT Pub. Date: Nov. 20, 2014

(65) Prior Publication Data
US 2016/0087456 A1 Mar. 24, 2016

(30) Foreign Application Priority Data
May 15, 2013 (JP) .................................. 2013-103062

(51) Int. Cl.
*H04B 5/00* (2006.01)
*H02J 50/12* (2016.01)
(Continued)

(52) U.S. Cl.
CPC ............ *H02J 50/12* (2016.02); *H01F 27/362* (2013.01); *H01F 38/14* (2013.01); *H02J 5/005* (2013.01); *H02J 50/70* (2016.02); *H04B 5/00* (2013.01)

(58) Field of Classification Search
CPC .................................. H02J 50/00; H04B 5/00
(Continued)

(56) References Cited

U.S. PATENT DOCUMENTS 8,217,535 B2 *  7/2012  Uchida ................... H02J 5/005
                                              307/104
8,816,537 B2 *  8/2014  Ichikawa .............. B60L 11/123
                                              307/104
(Continued)

FOREIGN PATENT DOCUMENTS

JP      2003-158027 A      5/2003
JP      2004-166384 A      6/2004
(Continued)

OTHER PUBLICATIONS

International Search Report for PCT Application No. PCT/JP2014/062951, dated Jul. 29, 2014.

*Primary Examiner* — Adi Amrany

(57) ABSTRACT

The present invention provides a power transfer system capable of reducing electromagnetic energy that disappears into a medium as a resistor when the coil of a power transmitting device and the coil of a power receiving device are apart from each other, in such a way that the power transmitting device of the power transfer system is equipped with a backside dielectric body and a shield body. A power transmitting device (11) faces a power receiving device (12) through a medium. The power transmitting device (11) comprises: a power transmission coil (111); a containment portion (112) having a first surface (112A) facing the power receiving device and a second surface (112B) on the oppo-
(Continued)

site side of the first surface and having a dielectric body covering the power transmission coil (111); a backside dielectric body (113) provided on the second surface (112B) of the containment portion and having a first surface (113A) facing the containment portion and a second surface (113B) on the opposite side of the first surface; and a shield body (114) provided on the second surface (113B) of the backside dielectric body.

20 Claims, 28 Drawing Sheets

(51) Int. Cl.
  *H02J 50/70* (2016.01)
  *H01F 27/36* (2006.01)
  *H01F 38/14* (2006.01)
  *H02J 5/00* (2016.01)

(58) Field of Classification Search
  USPC .......................................................... 307/104
  See application file for complete search history.

(56) References Cited

U.S. PATENT DOCUMENTS

| | | | |
|---|---|---|---|
| 9,887,681 B2* | 2/2018 | Tanomura | H03H 7/40 |
| 2010/0065352 A1* | 3/2010 | Ichikawa | B60L 11/182 |
| | | | 180/65.8 |
| 2010/0225271 A1* | 9/2010 | Oyobe | B60L 5/005 |
| | | | 320/108 |
| 2011/0254376 A1* | 10/2011 | Sasaki | B60L 5/005 |
| | | | 307/104 |
| 2012/0242447 A1* | 9/2012 | Ichikawa | B60L 11/182 |
| | | | 336/84 C |
| 2012/0262002 A1* | 10/2012 | Widmer | H04B 5/0037 |
| | | | 307/104 |
| 2013/0038135 A1* | 2/2013 | Ichikawa | B60L 11/182 |
| | | | 307/104 |
| 2013/0119774 A1* | 5/2013 | Ichikawa | B60L 11/123 |
| | | | 307/104 |
| 2013/0127242 A1* | 5/2013 | Ichikawa | B60L 11/182 |
| | | | 307/9.1 |
| 2014/0029233 A1* | 1/2014 | Yanagida | B60L 11/182 |
| | | | 361/818 |
| 2014/0246916 A1* | 9/2014 | Von Novak | H02J 17/00 |
| | | | 307/104 |
| 2015/0001957 A1* | 1/2015 | Ichikawa | B60L 11/182 |
| | | | 307/104 |
| 2015/0008877 A1* | 1/2015 | Ichikawa | H01F 27/362 |
| | | | 320/108 |
| 2015/0311880 A1* | 10/2015 | Yoshida | H02J 7/0042 |
| | | | 307/104 |
| 2015/0365066 A1* | 12/2015 | Tanomura | H04B 5/0075 |
| | | | 307/104 |

FOREIGN PATENT DOCUMENTS

| | | | | |
|---|---|---|---|---|
| JP | 2006-042519 A | 2/2006 | | |
| JP | 2006-245950 A | 9/2006 | | |
| JP | 2007-324532 A | 12/2007 | | |
| JP | 2011-022640 A | 2/2011 | | |
| JP | 2011091999 A | * 5/2011 | ............ B60L 11/182 |
| JP | 4772744 B | 9/2011 | | |
| JP | 2011-244530 A | 12/2011 | | |
| JP | 2012-504387 A | 2/2012 | | |
| JP | 2012-050321 A | 3/2012 | | |
| JP | 2012-089618 A | 5/2012 | | |
| WO | 2010/036980 A1 | 4/2010 | | |
| WO | 2011/030804 A1 | 3/2011 | | |

* cited by examiner

FIG. 39

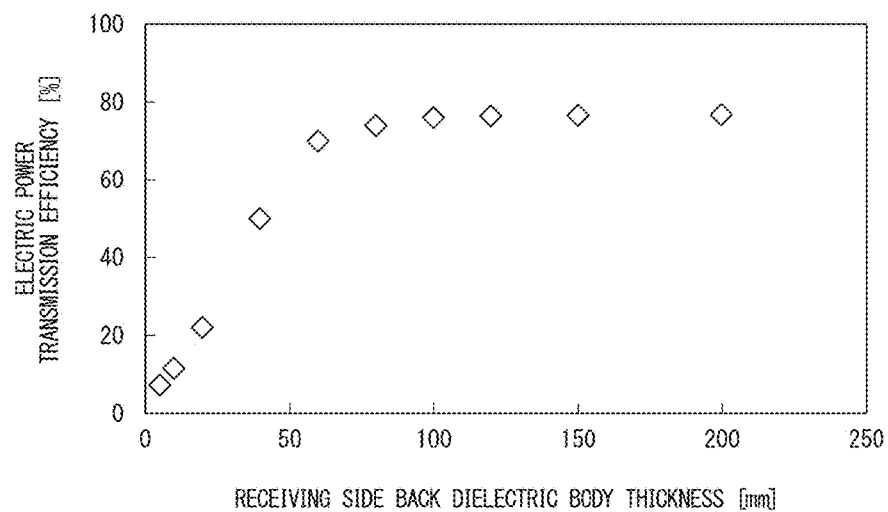

FIG. 40

| MEDIUM | CONDUCTIVITY (S/m) | RELATIVE PERMITTIVITY |
|---|---|---|
| SEAWATER | APPROXIMATELY 4 | APPROXIMATELY 81 |
| RIVER WATER | APPROXIMATELY $10^{-2} \sim 10^{-1}$ | APPROXIMATELY 81 |
| FRESH WATER, TAP WATER | APPROXIMATELY $10^{-3} \sim 10^{-2}$ | APPROXIMATELY 81 |
| SOIL (WET) | APPROXIMATELY $10^{-2} \sim 10^{-1}$ | APPROXIMATELY 3~6 |
| CONCRETE | APPROXIMATELY $10^{-3} \sim 10^{-2}$ | APPROXIMATELY 5~10 |
| SOIL (DRY) | APPROXIMATELY $10^{-4} \sim 10^{-3}$ | APPROXIMATELY 3~6 |
|  |  |  |
| *AIR | 0 | APPROXIMATELY 1 |

POWER TRANSFER SYSTEM WITH SHIELDING BODY, POWER TRANSMITTING DEVICE WITH SHIELDING BODY, AND POWER TRANSFER METHOD FOR POWER TRANSMITTING SYSTEM

This application is a National Stage Entry of PCT/JP2014/062951 filed on May 15, 2014, which claims priority from Japanese Patent Application 2013-103062 filed on May 15, 2013, the contents of all of which are incorporated herein by reference, in their entirety.

TECHNICAL FIELD

The present invention relates to a power transfer system, a power transmitting device, a power receiving device, and a power transfer method.

BACKGROUND ART

In recent years, marine resource exploration equipments and undersea earthquake sensor networks for early earthquake detection are becoming widespread, and there is an increased demand for a device for supplying electric power to these equipments. The device for supplying electric power needs to use a wireless power transmission technique that enables efficient power transmission even in seawater, because the surrounding area of the device is seawater. The wireless power transmission technique needs to be a technique that does not require the power supply metal plugs to be exposed, and that has no possibility of shorting even in seawater, which has an electric conductivity of approximately 4 [S/m].

In general, a power transmitting device that wirelessly transmits/receives electric power has a coil including a conductor wire wound thereon several times. Application of alternating current power to this coil of this power transmitting device produces a magnetic flux that interlinks with the coil. This magnetic flux interlinking with the coil of the power receiving device causes induced current to be generated in the coil of the power receiving device. As a result of this, power transmission is performed.

Regarding the wireless technique, for example, Patent Document 1 discloses a technique in which a terminal device main body and a removable electronic device such as a memory card, perform electromagnetic induction type communication using wireless millimeter wave signals.

Patent Document 2 discloses a technique that uses electromagnetic induction in which an inductance value between the power transmitting device and the power receiving device is increased, using a magnetic body, to thereby increase the distance of electric power transmission.

Patent Document 3 discloses a technique that uses electromagnetic induction in which resonance (magnetic field resonance) is made at the same frequency, using a coil of a high Q value, to thereby improve mutual inductance between the power transmitting device and the power receiving device, and increase the distance of electric power transmission.

PRIOR ART DOCUMENTS

Patent Documents

[Patent Document 1] Japanese Unexamined Patent Application, First Publication No. 2011-022640

[Patent Document 2] Japanese Patent Publication No. 4772744

[Patent Document 3] Published Japanese Translation No. 2012-504387 of PCT International Publication

SUMMARY OF THE INVENTION

Problem to be Solved by the Invention

However, in order to perform electric power transmission efficiently in the wireless power transmission techniques of Patent Document 1 through Patent Document 3 that use electromagnetic induction technology, it is necessary to have the coil of the power transmitting device and the coil of the power receiving device distanced from each other such that they are in almost intimate contact. Accordingly, for example, in a case where a submarine is the target of electric power transmission in seawater, when supplying electric power to the submarine, positioning between the submarine and the electric power supply device needs to be performed at a high level of precision. Therefore, it is difficult to perform stable electric power supply.

It is a known fact that only a limited level of electric power transmission efficiency can be achieved even if the techniques for increasing power transmission distance disclosed in Patent Document 2 and Patent Document 3, which are techniques for increasing in-air power transmission distance, are applied to power transmission in seawater. The reason for this is that electric conductivity and dielectric permittivity significantly differ between air and seawater, and the power transmission mechanisms in a medium differ between in-air power transmission and in-seawater power transmission. The electric conductivity of air is 0 [S/m], and the relative permittivity of air is approximately 1. The electric conductivity of seawater is approximately 4 [S/m], and the relative permittivity of seawater is approximately 81.

Here is briefly described the point of physical difference between the case where wireless electric power propagates through air and the case where it propagates through seawater.

In the case of electric power transmission through air, the level of energy loss in the medium (air) is lower than that in seawater. The factors of reduced electric power transmission efficiency mainly consist of conductor loss in the coil, consistency loss between the power transmitting device and the power receiving device, reflection loss such as magnetic flux leakage, and radiation loss. Particularly in the technique disclosed in Patent Document 2, a coil of a high Q value is used, and a non-radiative phenomenon, in which energy is accumulated in close proximity to the power transmitting/receiving devices, is created, to thereby effectively suppress this radiation loss.

In the case of electric power transmission through seawater, the medium (seawater) has a certain level of electric conductivity, and therefore, electric power consumption associated with the medium becomes an energy loss. The contributing factor to this energy loss is the electric conductivity of the seawater and the electric field generated in the seawater. That is to say, a potential gradient in proportion to the product of this electric conductivity and electric field is generated in the seawater, and a loss occurs as a result. Moreover, since the electric conductivity of seawater is high, there is a problem in that if non-directional energy output is made from the power transmitting device in the seawater, some will not reach the opposing power receiving device, and energy loss increases. Therefore, in order to efficiently perform electric power transmission in seawater, directionality needs to be provided so as to connect the coil surfaces that oppose each other, and an energy flow substantially perpendicular to both of the coil surfaces needs to be formed.

The coil surface here refers to a surface that includes, as an outer shape, the loop that is formed by electric current flowing through the coil.

Taking into consideration the difference between the in-air energy propagation mechanism and the in-seawater energy propagation mechanism, it is particularly difficult, with use of the technique disclosed in Patent Document 1, to transmit millimeter wave signals through a good conductor medium such as seawater. For example, in the case of a 60 [GHz] millimeter wave, the distance at which energy decays to a quarter in propagation through seawater is 100 [μm] or less. Therefore, it is extremely difficult to perform propagation of 10 [cm] or more in seawater.

Here is described a case of increasing the distance of electric power supply through seawater with use of the technique disclosed in Patent Document 2 that uses magnetic bodies and resonance. In this case, the magnetic flux increases. However, on the other hand, the electric field component that radiates into seawater also increases, in association with the increased magnetic flux. As a result, the electric power transmission efficiency will not increase. Furthermore, the technique disclosed in Patent Document 2 that uses magnetic bodies and resonance is a technique that uses the non-radiative phenomenon. Accordingly, it is fundamentally difficult to realize an increase in the distance of electric power transmission within a highly conductive medium.

Here is described a case of using a relevant magnetic field resonance technique such as one disclosed in Patent Document 3. In this case, efficient energy transmission can be performed only by having an equal resonance frequency in the power transmitting device and the power receiving device. However, since the relative permittivity in seawater is 81, which is significant, the resonance frequency is influenced significantly by the impedance of the medium between the power transmitting device and the power receiving device. Therefore, it is difficult to perform energy transmission by simply using the resonance phenomenon of the power transmitting/receiving devices. Furthermore, the magnetic field resonance technique is a technique that uses the non-radiative phenomenon, and it is therefore fundamentally difficult to realize an increase in the distance of electric power transmission within a highly conductive medium.

Various types of media such as the ones shown in the table of FIG. 40 also have comparatively high electric conductivity and relative permittivity. Therefore, similar problems may occur also in the case of performing electric power transmission wirelessly in these types of media in addition to seawater.

Moreover, even if an increased electric power transmission distance is realized, it is still necessary to consider the impact of electromagnetic field leaked from the power transmitting device and the power receiving device, on the surrounding area. For example, in the case of applying the power transfer system to a submarine, there is a possibility that the control circuit equipped on the submarine may be influenced by the electromagnetic field leaked from the power transmitting/receiving devices and it may malfunction or fail as a result of it.

For this reason, it is necessary, in the surrounding area of the power transmitting device and the power receiving device of the power transfer system, to provide a shielding structure that prevents electromagnetic field leakage that occurs from the antenna. However, in a case where the shielding structure is too close to the antenna, if magnetic flux passing through the shielding structure changes, an eddy current occurs within the shielding structure so as to offset the change in the magnetic flux, lowering the level of power transmission efficiency of the power transfer system. Therefore, the challenge is to realize a power transfer system including a shielding structure that suppresses reduction in transmission efficiency to the highest possible extent and that prevents electromagnetic field leakage occurring from the antenna to the highest possible extent.

An exemplary object of the present invention is to provide a power transfer system, a power transmitting device, a power receiving device, and a power transfer method that solve the above problems.

Means for Solving the Problem

A power transfer system according to a first exemplary aspect of the present invention includes a power transmitting device and a power receiving device that are opposed to each other via a medium. The power transmitting device includes: a transmission coil; a first containment unit that includes a first surface opposed to the power receiving device and a second surface on an opposite side to the first surface, the first containment unit including a dielectric body that covers the transmission coil; a first back dielectric body that is provided on the second surface of the first containment unit, the first back dielectric body including a first surface opposed to the first containment unit and a second surface on an opposite side to the first surface; and a first shielding body that is provided on the second surface of the first back dielectric body. The receiving device includes: a receiving coil; a second containment unit that includes a first surface opposed to the power transmitting device and a second surface on an opposite side to the first surface, the second containment unit including a dielectric body that covers the receiving coil; a second back dielectric body that is provided on the second surface of the second containment unit, the second back dielectric body including a first surface opposed to the second containment unit and a second surface on an opposite side to the first surface; and a second shielding body that is provided on the second surface of the second back dielectric body, and the power transmitting device transmits electric power at a resonance frequency that is determined by an impedance of an electric power transmission path including the power transmitting device, the power receiving device, and the medium.

A power transmitting device according to a second exemplary aspect of the present invention is opposed to a power receiving device via a medium. The power transmitting device includes: a transmission coil; a containment unit that includes a first surface opposed to the power receiving device and a second surface on an opposite side to the first surface, the containment unit including a dielectric body that covers the transmission coil; a back dielectric body that is provided on the second surface of the containment unit, the back dielectric body including a first surface opposed to the containment unit and a second surface on an opposite side to the first surface; and a shielding body that is provided on the second surface of the back dielectric body.

A power receiving device according to a third exemplary aspect of the present invention is opposed to a power transmitting device via a medium. The power receiving device includes: a receiving coil; a containment unit that includes a first surface opposed to the power transmitting device and a second surface on an opposite side to the first surface, the containment unit including a dielectric body that covers the receiving coil; a back dielectric body that is provided on the second surface of the containment unit, the back dielectric body including a first surface opposed to the containment unit and a second surface on an opposite side to the first surface; and a shielding body that is provided on the second surface of the back dielectric body.

A power transfer system according to a fourth exemplary aspect of the present invention is used for a power transfer system including a power transmitting device and a power receiving device that are opposed to each other via a medium. The power transfer method includes: preparing a power transmitting device including a transmission coil, a first containment unit, a first back dielectric body and a first shielding body, the first containment unit including a first surface opposed to the power receiving device and a second surface on an opposite side to the first surface, the first containment unit including a dielectric body that covers the transmission coil, the first back dielectric body being provided on the second surface of the first containment unit, the first back dielectric body including a first surface opposed to the first containment unit and a second surface on an opposite side to the first surface, the first shielding body being provided on the second surface of the first back dielectric body; preparing a power receiving device including a receiving coil, a second containment unit, a second back dielectric body and a second shielding body, the second containment unit including a first surface opposed to the power transmitting device and a second surface on an opposite side to the first surface, the second containment unit including a dielectric body that covers the receiving coil, the second back dielectric body being provided on the second surface of the second containment unit, the second back dielectric body including a first surface opposed to the second containment unit and a second surface on an opposite side to the first surface, the second shielding body being provided on the second surface of the second back dielectric body; and transmitting electric power at a resonance frequency that is determined by an impedance of an electric power transmission path including the power transmitting device, the power receiving device, and the medium.

A power transfer method according to a fifth exemplary aspect of the present invention is used for a power transmitting device, the power transmitting device being opposed to a power receiving device via a medium. The power transfer method includes: preparing a power transmitting device including a transmission coil, a containment unit, a back dielectric body and a shielding body, the containment unit including a first surface opposed to the power receiving device and a second surface on an opposite side to the first surface, the containment unit including a dielectric body that covers the transmission coil, the back dielectric body being provided on the second surface of the containment unit, the back dielectric body including a first surface opposed to the containment unit and a second surface on an opposite side to the first surface, the shielding body being provided on the second surface of the back dielectric body; and transmitting electric power at a resonance frequency that is determined by an impedance of an electric power transmission path including the power transmitting device, the power receiving device, and the medium.

A power transfer method according to a sixth exemplary aspect of the present invention is used for a power receiving device, the power receiving device being opposed to a power transmitting device via a medium. The power transfer method includes: preparing a receiving coil, a containment unit, a back dielectric body and a shielding body, the containment unit including a first surface opposed to the power transmitting device and a second surface on an opposite side to the first surface, the containment unit including a dielectric body that covers the receiving coil, the back dielectric body being provided on the second surface of the containment unit, the back dielectric body including a first surface opposed to the containment unit and a second surface on an opposite side to the first surface, the shielding body being provided on the second surface of the back dielectric body; and receiving electric power at a resonance frequency that is determined by an impedance of an electric power transmission path including the power transmitting device, the power receiving device, and the medium.

Effect of the Invention

According to an exemplary embodiment of the present invention, it is possible to reduce electromagnetic energy that is diffused into a medium and that becomes lost when the coil of the power transmitting device and the coil of the power receiving device are separated from an almost intimate contact state. As a result, it is possible to increase the distance of wireless electric power transmission within a medium. Furthermore, by shielding against electromagnetic field leakage generated by the power transmitting device and the power receiving device, it is possible to prevent malfunction or failure of the control circuit as a result of being influenced by the electromagnetic field leaked from the power transmitting/receiving devices.

BRIEF DESCRIPTION OF THE DRAWINGS

FIG. 39 is a diagram showing electric power transmission efficiency simulation results in a fourth example of the present invention.

FIG. 40 is a diagram showing a table that summarizes electric conductivities and relative permittivities of various types of media.

EMBODIMENTS FOR CARRYING OUT THE INVENTION

Figure 1:
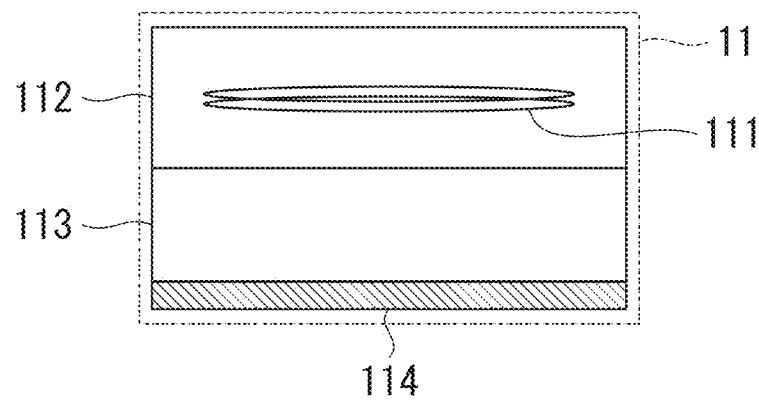
FIG. 1 is a diagram showing a configuration of a power transmitting device of an exemplary embodiment of the present invention.

FIG. 1 is a diagram showing a configuration of a power transmitting device 11 according to an exemplary embodiment of the present invention.

As shown in FIG. 1, the power transmitting device 11 includes, at least, a transmission coil (first coil) 111, and a transmission side containment unit 112 having a dielectric body that covers the transmission coil 111. The first containment unit 112 may be referred to as a first containment unit 112 in some cases. The power transmitting device 11 includes a transmission side back dielectric body 113 and a transmission side shielding body 114 on a surface on an opposite side to a surface opposed to a power receiving device 12. The transmission side back dielectric body 113 may be referred to as a first back dielectric body 113 in some cases (the same applies to transmission side back dielectric bodies 214 and 315). The transmission side shielding body 114 may be referred to as a first shielding body 114 in some cases (the same applies to transmission side shielding bodies 215, 316, 416, 516, and 616). The transmission coil 111 is formed from an electric conductor of conductor wire or the like that is wound several times. A helical coil or a spiral coil may be used as the transmission coil 111. However, the transmission coil 111 is not limited to these examples.

Figure 2:
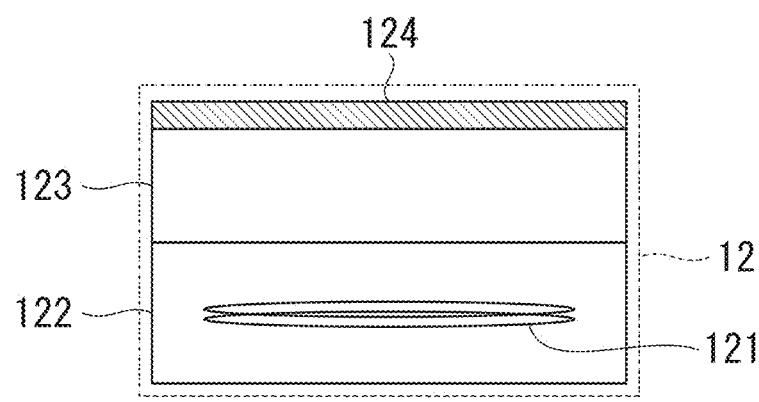
FIG. 2 is a diagram showing a configuration of a power receiving device of the exemplary embodiment of the present invention.

FIG. 2 is a diagram showing a configuration of a power receiving device according to the exemplary embodiment of the present invention.

As shown in FIG. 2, the power receiving device 12 includes, at least, a receiving coil (second coil) 121, and a receiving side containment unit 122 having a dielectric body that covers the receiving coil 121. The receiving side containment unit 122 may be referred to as a second containment unit 122 in some cases. The power receiving device 12 includes a receiving side back dielectric body 123 and a receiving side shielding body 124 on a surface on an opposite side to a surface opposed to the power transmitting device 11. The receiving side back dielectric body 123 may be referred to as a second back dielectric body 123 in some cases (the same applies to receiving side back dielectric bodies 224, 325 and 721). The receiving side shielding body 124 may be referred to as a second shielding body 124 in some cases (the same applies to receiving side shielding bodies 225, 326, 426, 526, 626, and 722). The receiving coil 121 is formed from an electric conductor of conductor wire or the like that is wound several times. A helical coil or a spiral coil may be used as the receiving coil 121. However, the receiving coil 121 is not limited to these examples.

First Exemplary Embodiment

Figure 3:
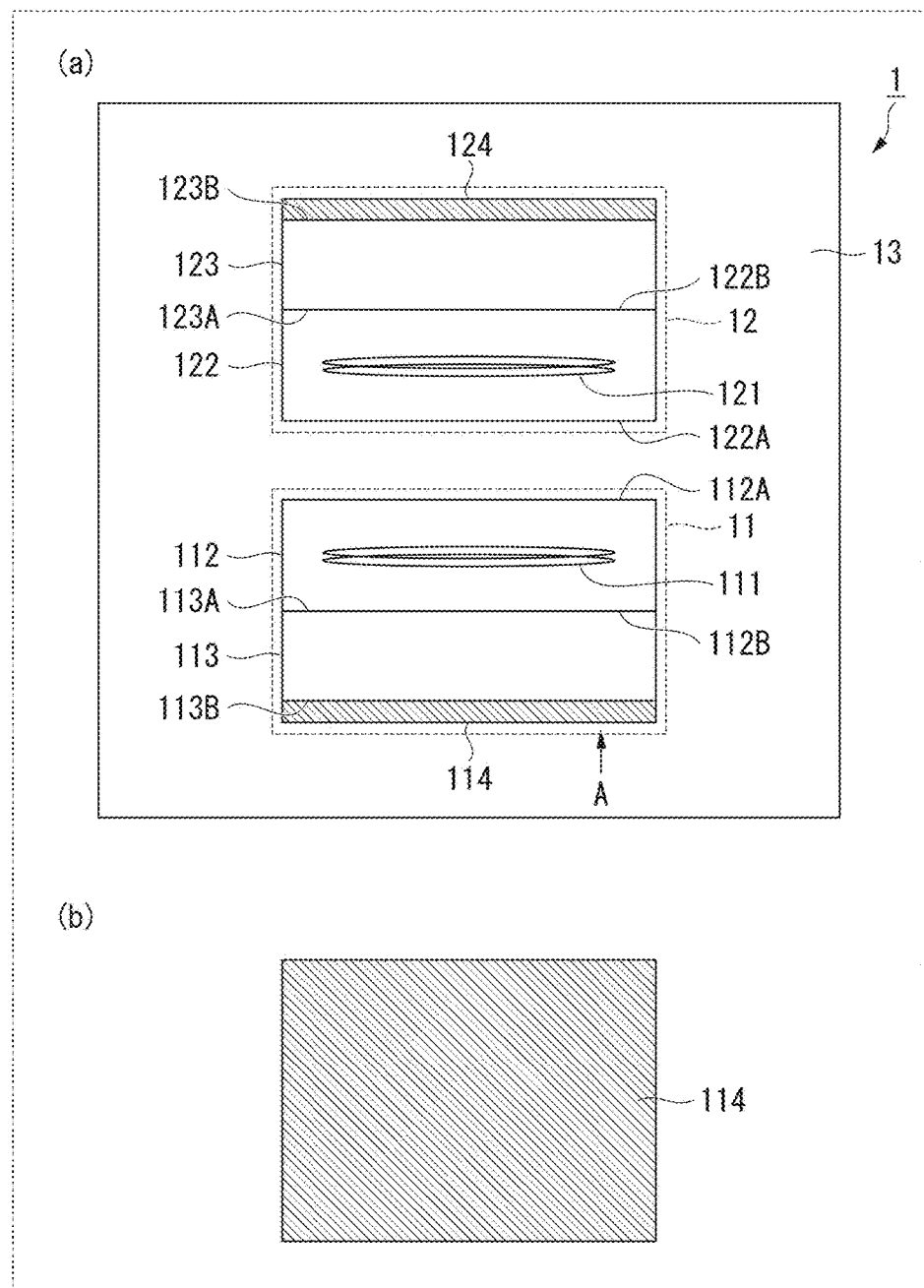
FIG. 3 is a diagram showing a configuration of a power transfer system according to a first exemplary embodiment of the present invention.

FIG. 3 is a diagram showing a configuration of a power transfer system 1 according to a first exemplary embodiment of the present invention.

Hereunder, the power transfer system 1 according to the first exemplary embodiment of the present invention is described, with reference to the figures.

As shown in part (a) of FIG. 3, the power transfer system 1 includes the power transmitting device 11 and the power receiving device 12. The power transmitting device 11 and the power receiving device 12 are covered by a good conductor medium (medium) 13.

The power transmitting device 11 includes a transmission coil 111, and a first containment unit 112 having a dielectric body that covers the transmission coil 111. The power transmitting device 111 further includes a first back dielectric body 113 and a first shielding body 114. The first containment unit 112 has a front surface (first surface) 112A opposed to the power receiving device 12, and a back surface (second surface) 112B on an opposite side to the front surface 112A. The first back dielectric body 113 is provided on the back surface 112B of the first containment unit 112. The first back dielectric body 113 has a front surface (first surface) 113A opposed to the first containment unit 112, and a back surface (second surface) 113B on an opposite side to the front surface 113A. The first shielding body 114 is provided on the back surface 113B of the first back dielectric body 113.

The power receiving device 12 includes a receiving coil 121, and a second containment unit 122 having a dielectric body that covers the receiving coil 121. The power receiving device 12 further includes a second back dielectric body 123 and a second shielding body 124. The second containment unit 122 has a front surface (first surface) 122A opposed to the power transmitting device 11, and a back surface (second surface) 122B on an opposite side to the front surface 122A. The second back dielectric body 123 is provided on the back surface 122B of the second containment unit 122. The second back dielectric body 123 has a front surface (first surface) 123A opposed to the second containment unit 122, and a back surface (second surface) 123B on an opposite side to the front surface 123A. The second shielding body 124 is provided on the back surface 123B of the second back dielectric body 123.

The transmission coil 111 and the receiving coil 121 are conductors of copper wire or the like that are wound several times. A helical coil or a spiral coil may be used as the transmission coil 111 and the receiving coil 121. However, the transmission coil 111 and the receiving coil 121 are not limited to these examples. The first shielding body 114 and the second shielding body 124 are disposed at positions that prevent reduction to the highest possible extent in the transmission efficiency of electric power transmission performed by the power transmitting device 11 and the power receiving device 12.

Part (b) of FIG. 3 is a diagram showing the shape of the first shielding body 114 viewed from the arrow A direction in part (a) of FIG. 3. The first shielding body 114 is disposed so as to cover the first back dielectric body 113 when viewed from the arrow A direction. Similarly, the second shielding body 124 is disposed so as to cover the second back dielectric body 123 when viewed from the opposite direction of the arrow A direction.

In the first exemplary embodiment, the transmission coil and the receiving coil are referred to collectively as a power transmission coil. The power transmitting device 11 may have the function of the power receiving device 12. The power receiving device 12 may have the function of the power transmitting device 11. The power transmitting device 11 and the power receiving device 12 may have the same configuration.

The first containment unit 112, the first back dielectric body 113, the second containment unit 122, and the second back dielectric body 123 may be formed from a dielectric body with a relative permittivity of approximately 2 to 20 and a dielectric loss tangent of 0.01 or less, such as polyethylene, polyimide, polyamide, fluorine resin, and acrylic.

FIG. 40 is a diagram showing a table that summarizes electric conductivities and relative permittivities of various types of media.

Here, the good conductor medium in each exemplary embodiment is described as being seawater given that seawater is a good conductor. However, the present invention is not limited to this. A good conductor medium is a medium, inside which an induced current occurs due to a magnetic field when the magnetic field acts thereon. The good conductor medium may be a substance with an electric conductivity of approximately $1 \times 10^{-4}$ [S/m] or more and a relative permittivity of not less than 1, such as river water, fresh water, tap water, soil, and concrete, and it may be a combination of these substances.

In the power transfer system 1 of the first exemplary embodiment, the relative permittivity of the dielectric body that forms the first containment unit 112 and the relative permittivity of the dielectric body that forms the first back dielectric body 113 may be different or may be the same. Moreover, the dielectric loss tangent of the dielectric body that forms the first containment unit 112 and the dielectric loss tangent of the dielectric body that forms the first back dielectric body 113 may be different or may be the same.

Similarly, in the power transfer system 1 of the first exemplary embodiment, the relative permittivity of the dielectric body that forms the second containment unit 122 and the relative permittivity of the dielectric body that forms the second back dielectric body 123 may be different or may be the same. The dielectric loss tangent of the dielectric body that forms the second containment unit 122 and the dielectric loss tangent of the dielectric body that forms the second back dielectric body 123 may be different or may be the same.

At least either one of the first back dielectric body 113 and the second back dielectric body 123 may be air.

Figure 4:
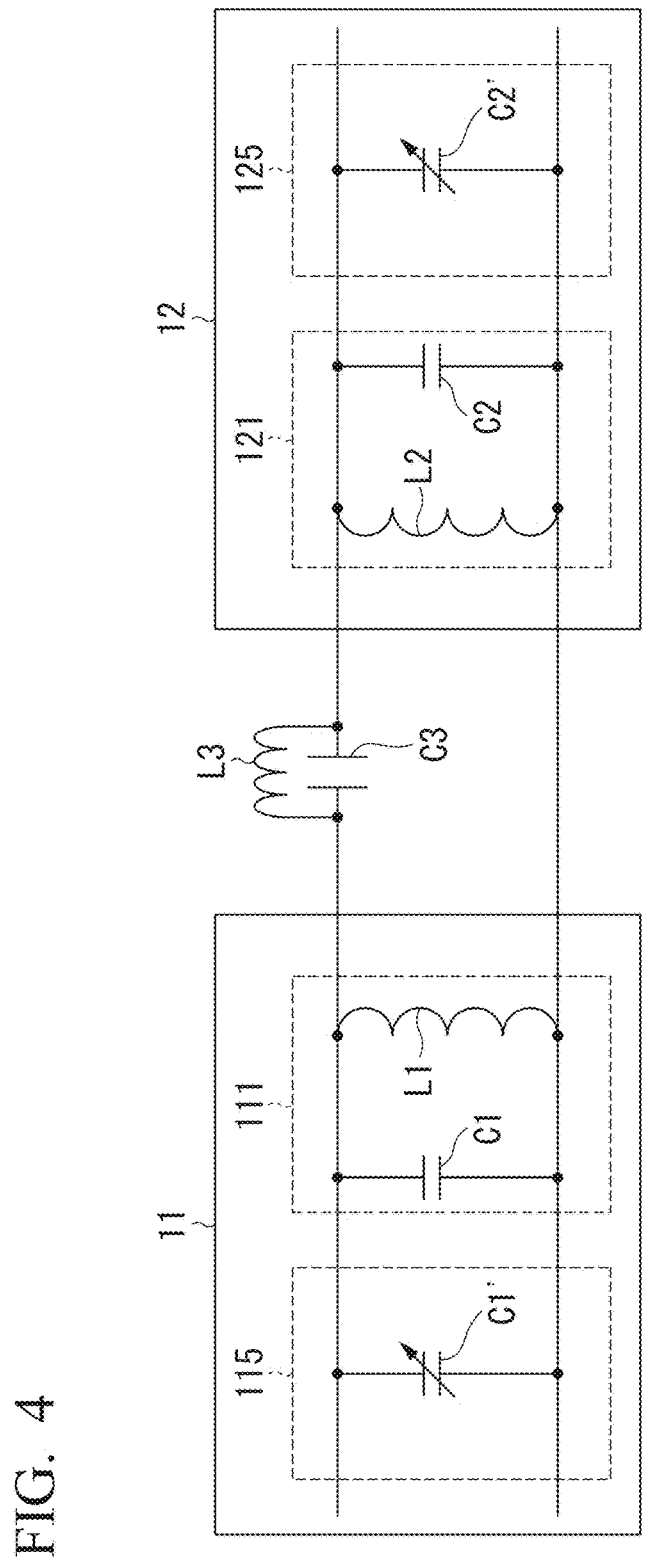
FIG. 4 is a diagram showing a part of an equivalent circuit of the power transfer system in the first exemplary embodiment, for when electric power output from the power transmitting device propagates to the power receiving device.

FIG. 4 is a diagram showing a part of an equivalent circuit of the power transfer system 1, for when electric power transmitted from the power transmitting device 11 propagates to the power receiving device 12.

Here is assumed a case where the first shielding body 114 and the second shielding body 124 as shown in FIG. 39 later, hardly cause a reduction in the transmission efficiency of electric power transmission performed by the power transmitting device 11 and the power receiving device 12 (a case where the thickness of the first shielding body 114 and the second shielding body 124 is not less than 100 [mm]). For this reason, the first shielding body 114 and the second shielding body 124 are considered as having no relation to the propagation efficiency of electric power transmitted from the power transmitting device 11 to the power receiving device 12. Accordingly, the first shielding body 114 and the second shielding body 124 are omitted from the equivalent circuit of the power transfer system 1.

The equivalent circuit of the power transmitting device 11 includes a transmission coil 111 and a transmission side impedance adjustment unit 115. The first impedance adjustment unit 115 may be referred to as a first impedance adjustment unit 115 in some cases. The first impedance adjustment unit 115 adjusts the impedance of the electric power transmission path including L1, L2, C1, C2, L3, and C3. The impedance of the transmission coil 111 is composed primarily of an inductance component L1, and a capacitance component C1 that is formed by the transmission coil 111 and the first containment unit 112. The inductance component L1 and the capacitance component C1 are uniquely defined based on the shape of the coil, the number of windings, the thickness of the copper wire, and the dielectric permittivity of the dielectric body that forms the first containment unit 112. Similarly, the impedance of the receiving coil 121 is composed primarily of an inductance component L2, and a capacitance component C2 that is formed by the receiving coil 121 and the second containment unit 122. The inductance component L2 and the capacitance component C2 are uniquely defined based on the shape of the coil, the number of windings, the thickness of the copper wire, and the dielectric permittivity of the dielectric body that forms the second containment unit 122.

The first impedance adjustment unit 115 and the receiving side impedance adjustment unit 125 are collectively referred to simply as an impedance adjustment unit. The second impedance adjustment unit 125 may be referred to as a second impedance adjustment unit 125 in some cases.

Alternating current power supplied to the power transmitting device 11 propagates through the electric power transmission path including L1, L2, C1, C2, L3, and C3 mentioned above, and propagates to the power receiving device 12. "L3" denotes a mutual inductance component in the transmission coil 111 and the receiving coil 121. "C3" denotes a capacitance component formed by the power transmitting device 11, the power receiving device 12, and the good conductor medium 13.

In order to increase transmission efficiency at the time when electric power propagates from the power transmitting device 11 to the power receiving device 12, it is important that impedance consistency is achieved at the frequency of propagating alternating current power on the electric power transmission path. As shown in FIG. 4, the first impedance adjustment unit 115 includes a capacitance component C1' of a variable capacitance. Moreover, the second impedance adjustment unit 125 includes a capacitance component CT of a variable capacitance. By adjusting the capacitance components C1' and C2', impedance matching can be achieved at an arbitrary frequency. In this manner, even in the case where the positional relationship between the power transmitting device 11 and the power receiving device 12 changes while electric power is being transmitted from the power transmitting device 11 to the power transmitting device 12, and the value of C3 changes, it is possible to stably supply electric power while maintaining resonance provided that C1' and C2' are appropriately adjusted so as to compensate for the change.

As a capacitance variable means, a varactor diode (variable capacitance diode) may be used, and it may also be configured by combining several capacitances with a switch transistor.

Hereunder, the combined capacitance component of the capacitance component of the transmission coil 111 itself and the capacitance component of the variable capacitance is denoted as C10, and the combined capacitance component C10 is described as a capacitance component C10 that forms the impedance of the power transmitting device 11. Similarly, the combined capacitance component of the capacitance component of the receiving coil 121 itself and the capacitance component of the variable capacitance is denoted as C20, and the combined capacitance component C20 is described as a capacitance component C20 that forms the impedance of the power receiving device 12.

In the power transfer system 1 of the first exemplary embodiment, in the case where the capacitance component C10, the capacitance component C20, the capacitance component C3, and a distance d satisfy a predetermined condition, a particularly high level of electric power transmission efficiency can be achieved. Distance d indicates the clearance between the power transmitting device 11 and the power receiving device 12.

Figure 5:
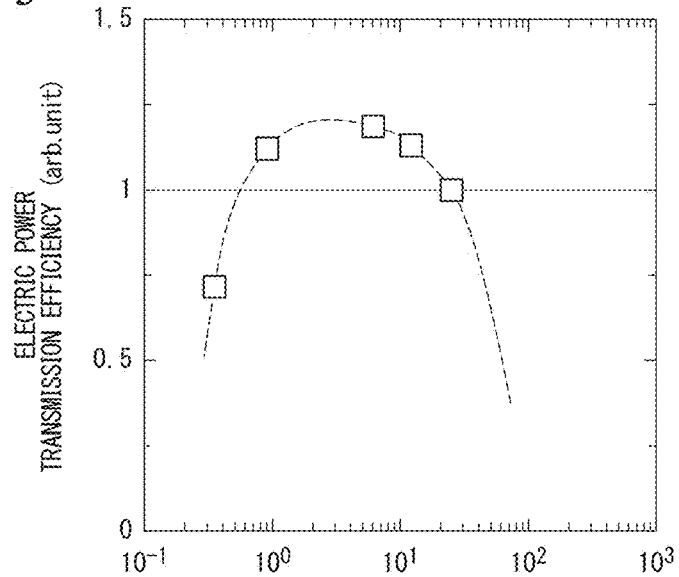
FIG. 5 is a diagram showing the influence on electric power transmission efficiency, in the first exemplary embodiment, of capacitance components of the power transmitting device and the power receiving device, and a capacitance component that arises between the power transmitting device and the power receiving device.

FIG. 5 is a diagram showing the influence on electric power transmission efficiency, of the capacitance components of the power transmitting device 11 and the power receiving device 12, and the capacitance component that arises between the power transmitting/receiving devices. The vertical axis of FIG. 5 represents electric power transmission efficiency. The horizontal axis of FIG. 5 represents "capacitance component C3 that arises between power transmitting device 11 and power receiving device 12"×"distance d between power transmitting device 11 and power receiving device 12"/("capacitance C10 of power transmitting device 11"+"capacitance C20 of power receiving device 12").

According to FIG. 5, in the case where impedance matching is achieved, a particularly high level of electric power transmission efficiency can be achieved when the above C10 [pF], C20 [pF], C3 [pF], and d[cm] satisfy the condition of Equation (1).

[Equation 1]

$$30 > \frac{C3 \times d}{C10 + C20} > 0.5 \qquad (1)$$

The impedance adjustment circuit need not be present as long as impedance matching is achieved. In this case, a particularly high level of electric power transmission efficiency can be achieved when the relationship of "30>C3× d/(C1+C2)>0.5" is satisfied.

When considering electric power of a frequency band of approximately several 100 [kHz] to 1 [MHz] in the first exemplary embodiment, according to a three dimensional electromagnetic field simulation, Equation 1 is satisfied under conditions where the outer shape area of the transmission coil 111 and the receiving coil 121 is approximately 10 [cm$^2$] to 30 [cm$^2$], and the distance d between the power transmitting device 11 and the power receiving device 12 is approximately 5 [cm] to 60 [cm].

In the power transfer system 1 according to the first exemplary embodiment, a particularly high level of electric power transmission efficiency can be achieved in the case where the ratio of the outer diameter of the transmission coil 111 and the dimensions of the first containment unit 112, and the ratio of the outer diameter of the receiving coil 121 and the dimensions of the second containment unit 122, satisfy a predetermined condition.

Figure 6:
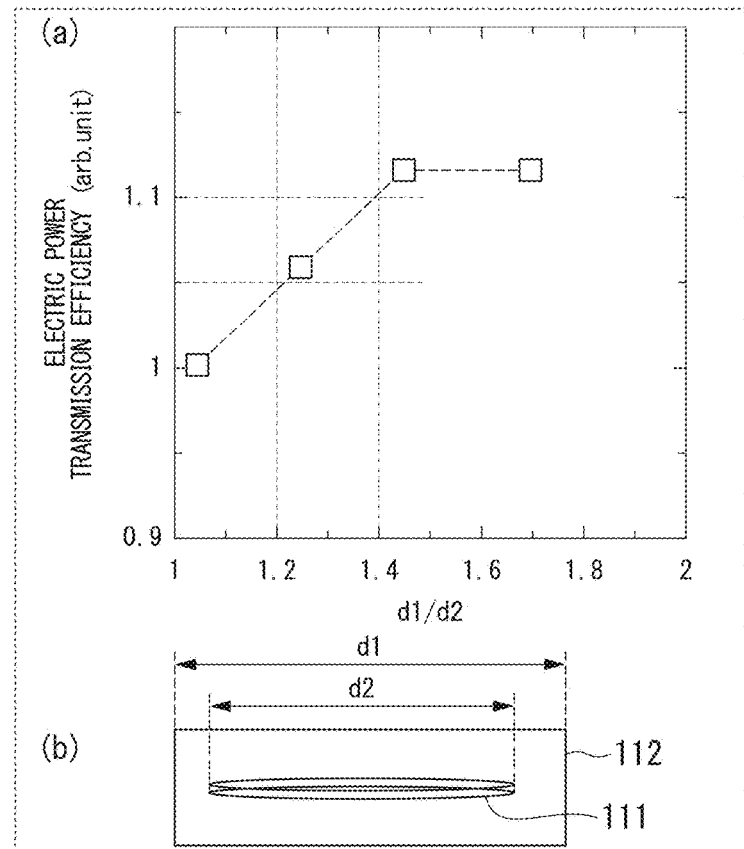
FIG. 6 is a diagram showing the influence on electric power transmission efficiency, of the ratio of the outer diameter of the transmission coil and the dimensions of the transmission side containment unit, in the first exemplary embodiment.

FIG. 6 is a diagram showing the influence on electric power transmission efficiency, of the ratio of the outer diameter of the transmission coil 111 and the dimensions of the first containment unit 112.

Part (b) of FIG. 6 shows size d1 of the first containment unit 112 in the direction along the coil surface, and outer diameter d2 of the transmission coil 111. According to part (a) of FIG. 6, the power transfer system 1 can achieve a high level of electric power transmission efficiency, which is 5 [%] or more higher than the minimum ratio 1 that can be achieved by manufacturing, by fixing the size d1 and making the outer diameter d2 variable to yield the ratio (d1/d2) of 1.2 or more. Furthermore, if a level of electric power transmission efficiency that is 10 [%] or more higher than the minimum ratio needs to be achieved, the value of the ratio (d1/d2) needs to be 1.4 or more. However, changes similar to those made to the outer diameter of the transmission coil 111 and the dimensions of the first containment unit 112 also need to be made to the outer diameter of the receiving coil 121 and the dimensions of the second containment unit 122.

A higher level of effect can be achieved in the power transfer system 1 if the power transmitting device 11 and the power receiving device 12 both satisfy the above condition.

The coil surface here refers to a surface that includes, as an outer shape, the loop that is formed by electric current flowing through the coil.

Next, specific operations of the power transfer system 1 according to the first exemplary embodiment are described.

First, an alternating power supply (not shown in the figure) of the power transmitting device 11 outputs alternating current power at a predetermined frequency. Next, the alternating current power that has been output, is supplied to the transmission coil 111 via the first impedance adjustment unit 115. The transmission coil 111 transmits the alternating current power to the outside (good conductor medium 13) as electromagnetic energy. The receiving coil 121 of the power receiving device 12 receives the transmitted electromagnetic energy. Here, the first impedance adjustment unit 115 and the second impedance adjustment unit 125 are adjusted so that the combined impedance of the respective impedances of the power transmitting device 11, the power receiving device 12, and the good conductor medium 13 resonates at the frequency of the electric power being transmitted. The electric power that has been received by the receiving coil 121 is sequentially supplied to the second impedance adjustment unit 125 and a converter (not shown in the figure). The energy that has been converted from alternating current to direct current by this converter is supplied to the target object of the purpose (such as a secondary battery and a sensor). This completes the process of electric power transmission.

In the power transfer system 1 according to the first exemplary embodiment, by having electric power output made at a resonance frequency that is determined by the combined impedance of the respective impedances of the power transmitting device 11, the power receiving device 12, and the good conductor medium 13, the level of electric power input to the receiving coil 121 can be made a maximum. Moreover, the first containment unit 112 and the second containment unit 122 suppress the electric field from spreading into the good conductor medium 13. As a result, there is achieved an effect of suppressing electromagnetic energy that diffuses and becomes lost in the good conductor medium 13.

Figure 7:
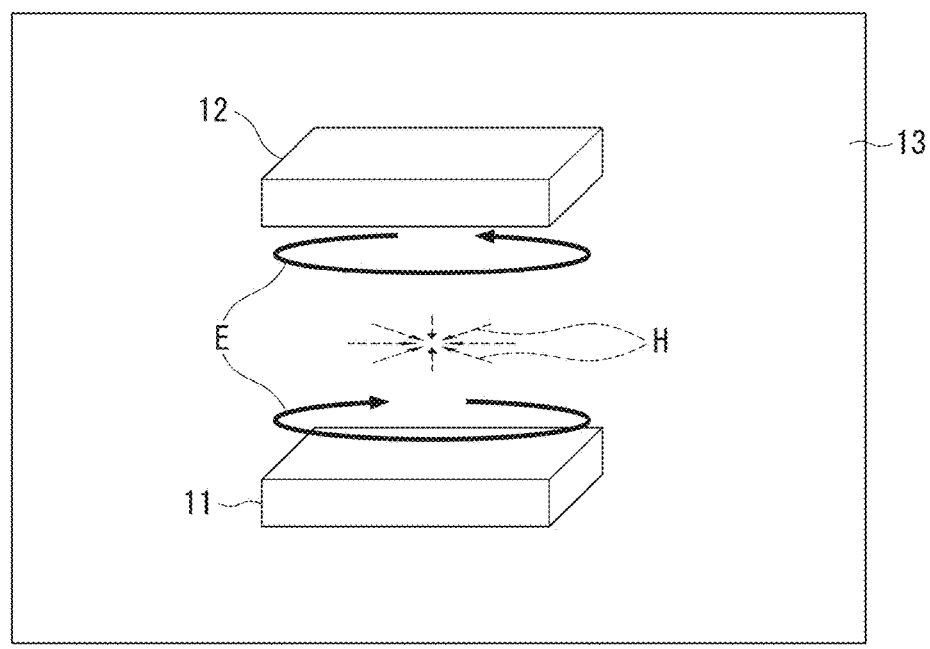
FIG. 7 is a diagram showing an electric field vector and a magnetic field vector, in the power transfer system according to the first exemplary embodiment.

FIG. 7 is a diagram showing an electric field vector and a magnetic field vector, in the power transfer system 1 according to the first exemplary embodiment. In FIG. 7, reference symbol "E" denotes electric fields and reference symbol "H" denotes magnetic field.

Figure 8:
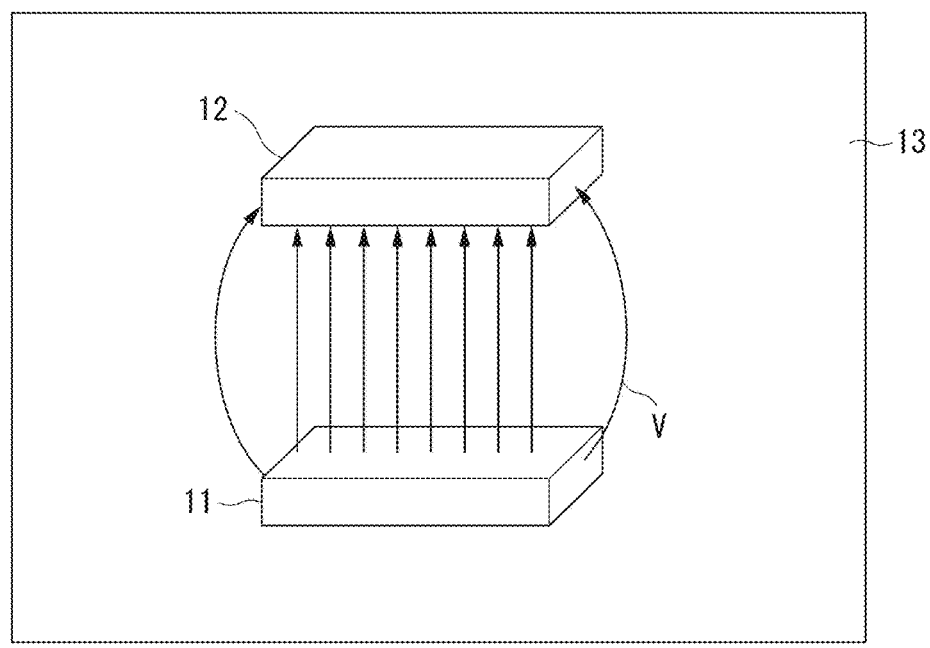
FIG. 8 is a diagram showing a pointing vector (energy flow) that occurs based on the electric field vector and the magnetic field vector, in the power transfer system according to the first exemplary embodiment.

FIG. 8 is a diagram showing a pointing vector (energy flow) that occurs based on the electric field vector and the magnetic field vector, in the power transfer system 1 according to the first exemplary embodiment.

FIG. 7 is a diagram that schematically shows a simulation result of the electric field and magnetic field that occur between the power transmitting device 11 and the power receiving device 12 at the time of performing electric power transmission. As shown in FIG. 7, in the power transfer system 1 of the first exemplary embodiment, the first containment unit 112 and the second containment unit 122 suppress the electric field from spreading into the good conductor medium 13. The magnetic field generated by the current flowing in the predetermined good conductor medium 13 and the coil causes an eddy current to occur in the good conductor medium 13. This eddy current creates a new magnetic field. This phenomenon occurs repeatedly, and thereby, the electric field and the magnetic field can be made substantially parallel with the coil surface. As a result, as shown in FIG. 8, it is possible to cause the pointing vector V (energy flow) from the power transmitting device 11 to the power receiving device 12 to occur vertically with respect to the coil surface.

The first impedance adjustment unit 115 and the second impedance adjustment unit 125 may further include an inductor to adjust impedance. The good conductor medium 13 is a type of medium that makes the pointing vector from the power transmitting device 11 to the power receiving device 12 substantially perpendicular to the coil surface, when performing electric power transmission in the power transfer system 1 at a resonance frequency that is determined by the impedance of the electric power transmission path.

In this manner, the power transfer system 1 according to the first exemplary embodiment is capable of suppressing diffusion and loss of electromagnetic energy in the good conductor medium, even in the near field where the power transmitting device 11 and the power receiving device 12 are comparatively distanced from each other. As a result, it is possible to increase the distance of wireless electric power transmission within the good conductor medium such as seawater. Furthermore, in the first exemplary embodiment, the first shielding body 114 and the second shielding body 124 shield against electromagnetic field leakage generated by the power transmitting device 11 and the power receiving device 12. Thereby it is possible to prevent malfunction or failure of the control circuit as a result of being influenced by the electromagnetic field leaked from the power transmitting device 11 and the power receiving device 12.

Second Exemplary Embodiment

Figure 9:
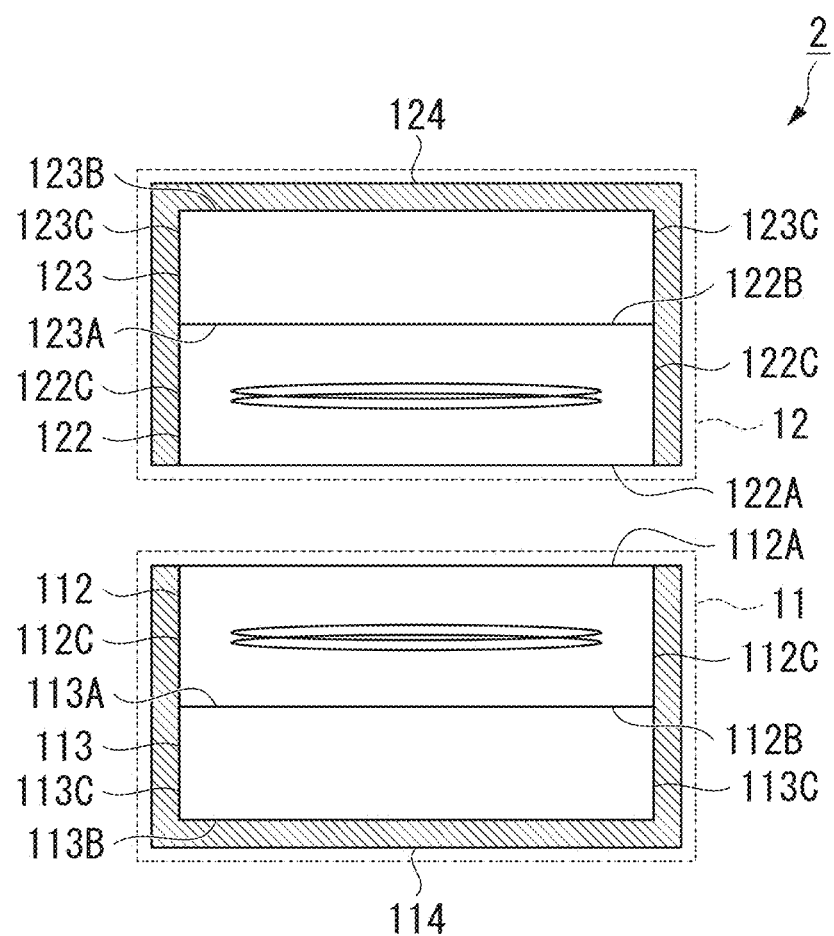
FIG. 9 is a diagram showing a configuration of a power transfer system according to a second exemplary embodiment of the present invention.

FIG. 9 is a diagram showing a configuration of a power transfer system 2 according to a second exemplary embodiment of the present invention.

As shown in FIG. 9, in the power transfer system 2 of the second exemplary embodiment of the present invention, the first shielding body 114 covers not only the back surface of the power transmitting device 11 but also its side surface. Moreover, similarly, the second shielding body 124 also covers not only the back surface of the power receiving device 12 but also its side surface. More specifically, the first shielding body 114 covers not only the back surface 113B of the first back dielectric body 113, but also the side surface 112C of the first containment unit 112 and the side surface 113C of the first back dielectric body 113. Similarly, the second shielding body 124 covers not only the back surface 123B of the second back dielectric body 123, but also the side surface 122C of the second containment unit 122 and the side surface 123C of the second back dielectric body 123. The power transfer system 2 according to the second exemplary embodiment is capable of suppressing diffusion and loss of electromagnetic energy in the good conductor medium, even in the near field where the power transmitting device 11 and the power receiving device 12 are comparatively distanced from each other. As a result, it is possible to increase the distance of wireless electric power transmission within the good conductor medium such as seawater. Furthermore, in the power transfer system 2 according to the second exemplary embodiment, the first shielding body 114 and the second shielding body 124 shield against electromagnetic field leakage generated by the power transmitting device 11 and the power receiving device 12. Thereby it is possible to prevent malfunction or failure of the control circuit as a result of being influenced by the electromagnetic field leaked from the power transmitting device 11 and the power receiving device 12. Moreover, by shielding against electromagnetic field leaked from the side surfaces of the power transmitting device 11 and the power receiving device 12, it is possible to prevent malfunction or failure of the control circuit as a result of being influenced by the electromagnetic field leaked from the power transmitting device 11 and the power receiving device 12.

Third Exemplary Embodiment

Figure 10:
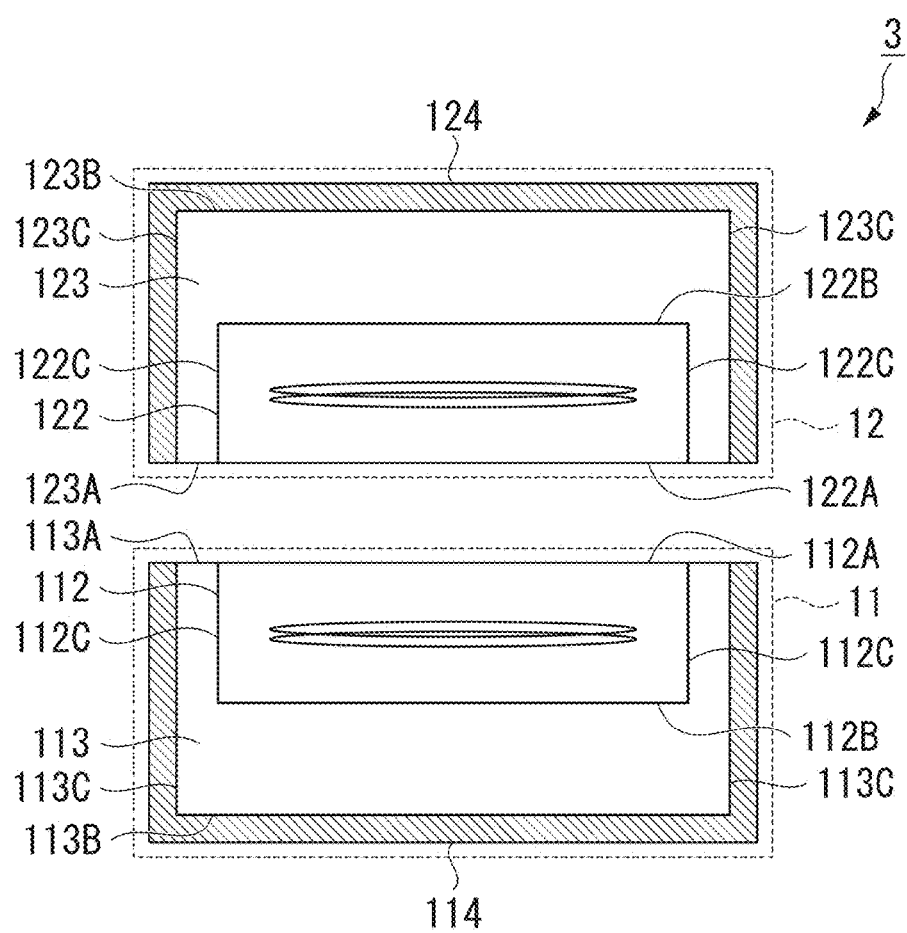
FIG. 10 is a diagram showing a configuration of a power transfer system according to a third exemplary embodiment of the present invention.

FIG. 10 is a diagram showing a configuration of a power transfer system 3 according to a third exemplary embodiment of the present invention.

As shown in FIG. 10, in the power transfer system 3 of the third exemplary embodiment of the present invention, the first back dielectric body 113 and the first shielding body 114 cover not only the back surface of the power transmitting device 11 but also the side surface of the power transmitting device 11. Similarly, the second back dielectric body 123 and the second shielding body 124 also, in a similar manner, cover not only the back surface of the power receiving device 12 but also the side surface of the power receiving device 12. More specifically, the first back dielectric body 113 covers the back surface 112B and the side surface 112C of the first containment unit 112. The first shielding body 114 covers the back surface 113B and the side surface 113C of the first back dielectric body 113. Similarly, the second back dielectric body 123 covers the back surface 122B and the side surface 122C of the second containment unit 122. The second shielding body 124 covers the back surface 123B and the side surface 123C of the second back dielectric body 123. The power transfer system 3 according to the third exemplary embodiment is capable of suppressing diffusion and loss of electromagnetic energy in the good conductor medium, even in the near field where the power transmitting device 11 and the power receiving device 12 are comparatively distanced from each other. As a result, it is possible to increase the distance of wireless electric power transmission within the good conductor medium such as seawater. Furthermore, in the power transfer system 3 according to the third exemplary embodiment, the first shielding body 114 and the second shielding body 124 shield against electromagnetic field leakage generated by the power transmitting device 11 and the power receiving device 12. Thereby it is possible to prevent malfunction or failure of the control circuit as a result of being influenced by the electromagnetic field leaked from the power transmitting device 11 and the power receiving device 12. Moreover, by shielding against electromagnetic field leaked from the side surfaces of the power transmitting device 11 and the power receiving device 12, it is possible to prevent malfunction or failure of the control circuit as a result of being influenced by the electromagnetic field leaked from the power transmitting device 11 and the power receiving device 12.

Fourth Exemplary Embodiment

Figure 11:
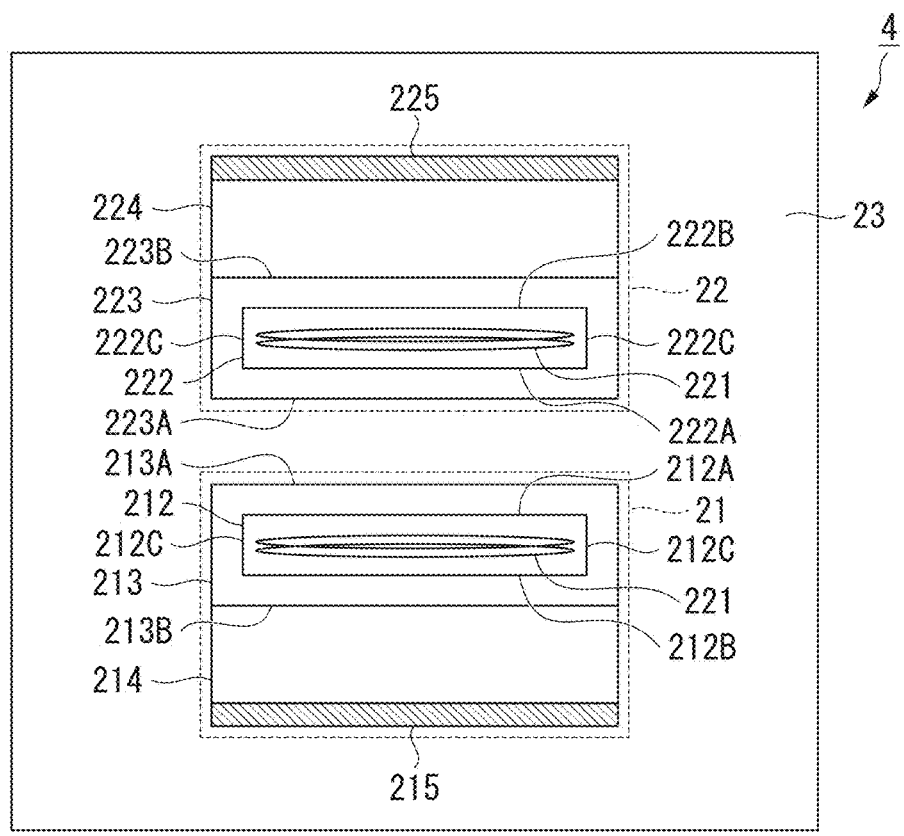
FIG. 11 is a diagram showing a configuration of a power transfer system according to a fourth exemplary embodiment of the present invention.

FIG. 11 is a diagram showing a configuration of a power transfer system 4 according to a fourth exemplary embodiment of the present invention.

Next, the power transfer system 4 according to the fourth exemplary embodiment of the present invention is described, with reference to the figures.

As shown in FIG. 11, the power transfer system 4 includes a power transmitting device 21 and a power receiving device 22. The power transmitting device 21 and the power receiving device 22 are covered by a good conductor medium (medium) 23.

The power transmitting device 21 includes a transmission coil (first coil) 211, a first transmission side containment unit 212, and a second transmission side containment unit 213. The first transmission side containment unit 212 may be referred to as a first primary containment unit 212 in some cases (the same applies to first transmission side containment units 312 and 612). The second transmission side containment unit 213 may be referred to as a first secondary containment unit 213 in some cases (the same applies to second transmission side containment units 313 and 613). The first primary containment unit 212 has a first dielectric body that covers the transmission coil 211. The first secondary containment unit 213 has a second dielectric body that covers the first primary containment unit 212. More specifically, the front surface 212A, the back surface 212B, and the side surfaces 212C of the first primary containment unit 212 are covered by the first secondary containment unit 213. The power transmitting device 21 further includes a first back dielectric body 214 and a first shielding body 215. The first secondary containment unit 213 has a front surface (first surface) 213A opposed to the power receiving device 22, and a back surface (second surface) 213B on an opposite side to the front surface 213A. The first back dielectric body 214 is provided on the back surface 213B of the first secondary containment unit 213. The first back dielectric body 214 has a front surface (first surface) 214A opposed to the first secondary containment unit 213, and a back surface (second surface) 214B on an opposite side to the front surface 214A. The first shielding body 215 is provided on the back surface 214B of the first back dielectric body 214.

The power receiving device 22 includes a transmission coil (second coil) 221, a first receiving side containment unit 222, and a second receiving side containment unit 223. The first receiving side containment unit 222 may be referred to as a second primary containment unit 222 in some cases (the same applies to first receiving side containment units 313 and 613). The second receiving side containment unit 223 may be referred to as a second secondary containment unit 223 in some cases (the same applies to second transmission side containment units 323 and 623). The second primary containment unit 222 has a first dielectric body that covers the receiving coil 221. The second secondary containment unit 223 has a second dielectric body that covers the second primary containment unit 222. More specifically, the front surface 222A, the back surface 222B, and the side surface 222C of the second primary containment unit 222 are covered by the second secondary containment unit 223. The power receiving device 22 includes a second back dielectric body 224 and a second shielding body 225 on a surface on an opposite side to the surface opposed to the power transmitting device 21. The second secondary containment unit 223 has a front surface (first surface) 223A opposed to the power transmitting device 21, and a back surface (second surface) 223B on an opposite side to the front surface 223A. The second back dielectric body 224 is provided on the back surface 223B of the second secondary containment unit 223.

The first shielding body 215 and the second shielding body 225 are disposed at positions that prevent reduction to the highest possible extent in the transmission efficiency of electric power transmission performed by the power transmitting device 21 and the power receiving device 22.

The first primary containment unit 212 and the second primary containment unit 222 are collectively referred to as a primary containment unit. Moreover, in the power transfer system 4 of the exemplary embodiment of the present invention, the first secondary containment unit 213 and the second secondary containment unit 223 are collectively referred to as a secondary containment unit.

The first primary containment unit 212, the first secondary containment unit 213, the first back dielectric body 214, the second primary containment unit 222, the first secondary containment unit 223, and the first back dielectric body 224 may be formed from a dielectric body with a relative permittivity of approximately 2 to 20 and a dielectric loss tangent of 0.01 or less, such as polyethylene, polyimide, polyamide, fluorine resin, and acrylic.

The relative permittivity of the first dielectric body that forms the first primary containment unit 212, the relative permittivity of the second dielectric body that forms the first secondary containment unit 213, and the relative permittivity of the first back dielectric body 214 may be different or may be the same. The dielectric loss tangent of the first dielectric body that forms the first primary containment unit 212, the dielectric loss tangent of the second dielectric body that forms the first secondary containment unit 213, and the dielectric loss tangent of the first back dielectric body 214 may be different or may be the same.

Similarly, the relative permittivity of the first dielectric body that forms the second primary containment unit 222, the relative permittivity of the second dielectric body that forms the second secondary containment unit 223, and the relative permittivity of the second back dielectric body 224 may be different or may be the same. The dielectric loss tangent of the first dielectric body that forms the second primary containment unit 222, the dielectric loss tangent of the second dielectric body that forms the second secondary containment unit 223, and the dielectric loss tangent of the second back dielectric body 224 may be different or may be the same.

At least either one of the first back dielectric body 214 and the second back dielectric body 224 may be air.

In the power transfer system 4 shown in FIG. 11, the power transmitting device 21 and the power receiving device 22 both includes a primary containment unit and a secondary containment unit. However, it is not limited to this configuration example. Only either one of the power transmitting device 21 and the power receiving device 22 may include a primary containment unit and secondary containment unit. The power transfer system 4 of the fourth exemplary embodiment may include the impedance adjustment unit described in the first exemplary embodiment.

In the power transfer system 4 of the fourth exemplary embodiment, in the case where the dielectric loss tangents of the respective dielectric bodies that form the first primary containment unit 212 and the first secondary containment unit 213 satisfy a predetermined condition, a higher level of electric power transmission efficiency can be achieved.

Figure 12:
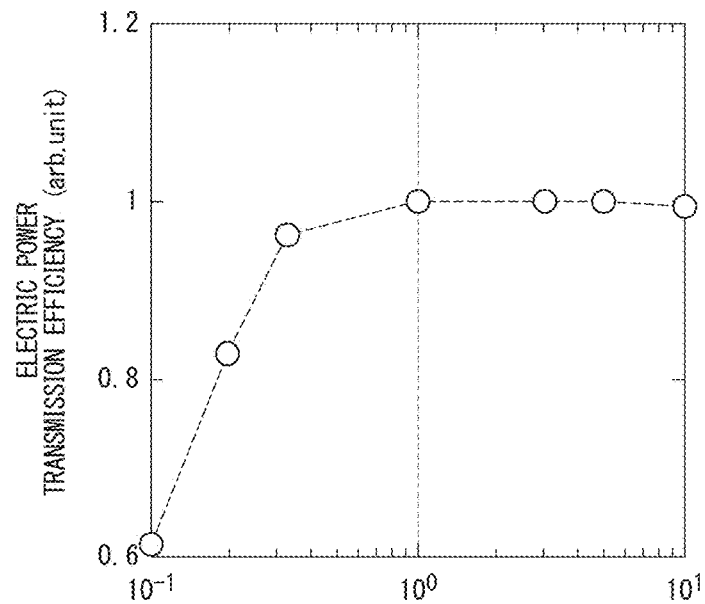
FIG. 12 is a diagram showing the influence on electric power transmission efficiency, of the ratio of the dielectric loss tangent of the first dielectric body and the dielectric loss tangent of the second dielectric body, in the fourth exemplary embodiment.

FIG. 12 is a diagram showing the influence on electric power transmission efficiency, of the ratio of the dielectric loss tangent of the first dielectric body and the dielectric loss tangent of the second dielectric body.

Here is assumed a case where the first shielding body 215 and the second shielding body 225 hardly cause a reduction in the transmission efficiency of electric power transmission performed by the power transmitting device 21 and the power receiving device 22. For this reason, the first shielding body 215 and the second shielding body 225 are considered as having no relation to the propagation efficiency of electric power transmitted from the power transmitting device 21 to the power receiving device 22. Therefore they are omitted in the following description of the power transfer system 4. The vertical axis of FIG. 12 represents electric power transmission efficiency. The horizontal axis of FIG. 12 represents the ratio of the dielectric loss tangent of the second dielectric body to the dielectric loss tangent of the first dielectric body. FIG. 12 shows a case where the relative permittivity of the second dielectric body is 10, and the relative permittivity of the first dielectric body is 2.1.

As shown in FIG. 12, in the power transfer system 4, by making the dielectric loss tangent of the second dielectric body greater than that of the first dielectric body, a higher level of electric power transmission efficiency can be achieved. A first reason for this is that the second dielectric body that forms the first secondary containment unit 213 in the power transmitting device 21 suppresses the electric field from spreading into the good conductor medium 23. A second reason is that dielectric loss is reduced in the vicinity of the transmission coil 211 by making the dielectric loss tangent of the first dielectric body that forms the first primary containment unit 212 small. A third reason is that the second dielectric body that forms the second secondary containment unit 223 in the power receiving device 22 suppresses the electric field from spreading into the good conductor medium 23. A fourth reason is that dielectric loss is reduced in the vicinity of the receiving coil 221 by making the dielectric loss tangent of the first dielectric body that forms the second primary containment unit 222 small.

In the power transfer system 4 of the fourth exemplary embodiment, in the case where the dielectric permittivities of the respective dielectric bodies that form the first primary containment unit 212 and the first secondary containment unit 213 satisfy a predetermined condition, a higher level of electric power transmission efficiency can be achieved.

Figure 13:
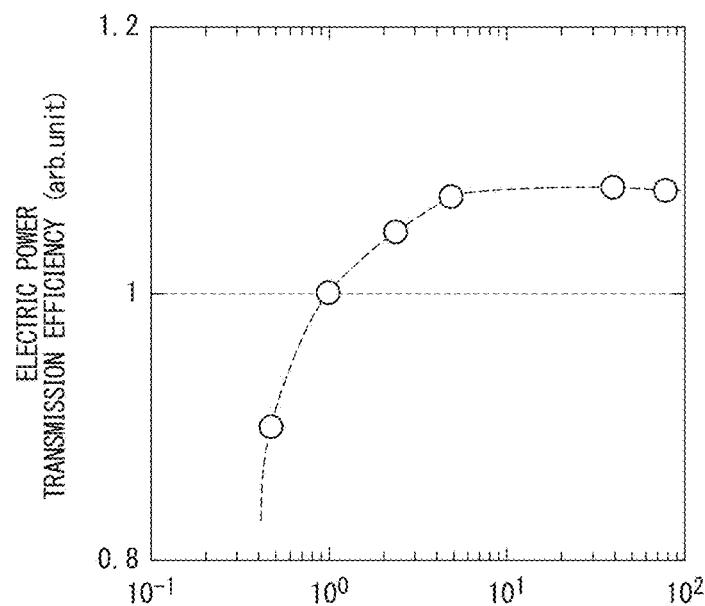
FIG. 13 is a diagram showing the influence on electric power transmission efficiency, of the relative permittivity of the first dielectric body and the relative permittivity of the second dielectric body, in the fourth exemplary embodiment.

FIG. 13 is a diagram showing the influence on electric power transmission efficiency, of the relative permittivity of the first dielectric body and the relative permittivity of the second dielectric body. The vertical axis of FIG. 13 represents electric power transmission efficiency. The horizontal axis of FIG. 13 represents the ratio of the relative permittivity of the second dielectric body to the relative permittivity of the first dielectric body. FIG. 13 shows a case where the dielectric loss tangent of the first dielectric body and the dielectric loss tangent of the second dielectric body are constant.

As shown in FIG. 13, in the power transfer system 4, by making the relative permittivity of the second dielectric body greater than that of the first dielectric body, a higher level of electric power transmission efficiency can be achieved.

Next, specific operations of the power transfer system 4 according to the fourth exemplary embodiment are described.

First, an alternating power supply (not shown in the figure) of the power transmitting device 21 outputs alternating current power at a predetermined frequency. Next, the alternating current power that has been output, is supplied to the transmission coil 211. The transmission coil 211 transmits the alternating current power to the outside (good conductor medium 23) as electromagnetic energy. The receiving coil 221 of the power receiving device 22 receives the transmitted electromagnetic energy. Here, the combined impedance of the respective impedances of the power transmitting device 21, the power receiving device 22, and the good conductor medium 23 is adjusted so that the transmission coil 211 and the receiving coil 221 resonate at the frequency of transmitted electric power. The electric power that has been received by the receiving coil 221 is input to a converter (not shown in the figure). The energy that has been converted from alternating current to direct current by this converter is supplied to the target object of the purpose (such as a secondary battery and a sensor). This completes the process of electric power transmission.

In the power transfer system 4 according to the fourth exemplary embodiment, by having electric power transmission made at a resonance frequency that is determined by the combined impedance of the respective impedances of the power transmitting device 21, the power receiving device 22, and the good conductor medium 23, the level of electric power input to the receiving coil 221 can be made a maximum. Moreover, the first secondary containment unit 213 and the second secondary containment unit 223 suppress the electric field from spreading into the good conductor medium 23. As a result, it is possible to suppress electromagnetic energy that diffuses and becomes lost in the good conductor medium 23. Moreover, the first primary containment unit 212 and the second primary containment unit 222 have an effect of reducing dielectric loss in close proximity to the transmission coil 211 and the receiving coil 221.

In this manner, the power transfer system 4 according to the fourth exemplary embodiment can achieve a level of electric power transmission efficiency higher than that of the power transfer system 1 according to the first exemplary embodiment. Furthermore, in the power transfer system 4 according to the fourth exemplary embodiment, the first shielding body 215 and the second shielding body 225 shield against electromagnetic field leakage generated by the power transmitting device 21 and the power receiving device 22. Thereby it is possible to prevent malfunction or failure of the control circuit as a result of being influenced by the electromagnetic field leaked from the power transmitting device 21 and the power receiving device 22.

Fifth Exemplary Embodiment

Figure 14:
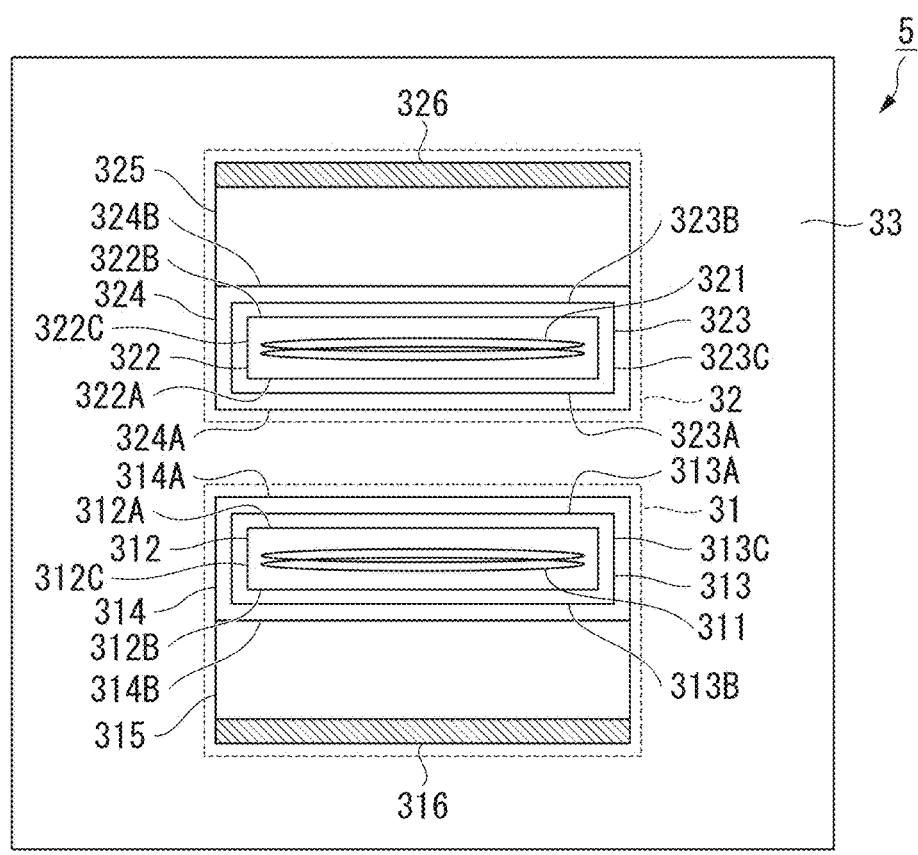
FIG. 14 is a diagram showing a configuration of a power transfer system according to a fifth exemplary embodiment of the present invention.

FIG. 14 is a diagram showing a configuration of a power transfer system 5 according to a fifth exemplary embodiment of the present invention.

Next, the power transfer system 5 according to the fifth exemplary embodiment of the present invention is described, with reference to the figures.

As shown in FIG. 14, the power transfer system 5 includes a power transmitting device 31 and a power receiving device 32. The power transmitting device 31 and the power receiving device 32 are covered by a good conductor medium (medium) 33.

The power transmitting device 31 includes a transmission coil (first coil) 311, a first primary containment unit 312, a first secondary containment unit 313, and a third transmission side containment unit 314. The third transmission side containment unit 314 may be referred to as a first tertiary containment unit 314 in some cases (the same applies to a third transmission side containment unit 614). The first primary containment unit 312 has a first dielectric body that covers the transmission coil 311. The first secondary containment unit 313 has a second dielectric body that covers the first primary containment unit 312. The first tertiary containment unit 314 has a third dielectric body that covers the first secondary containment unit 313. More specifically, the front surface 312A, the back surface 312B, and the side surface 312C of the first primary containment unit 312 are covered by the first secondary containment unit 313. The front surface 313A, the back surface 313B, and the side surface 313C of the first secondary containment unit 313 are covered by the first tertiary containment unit 314. The power transmitting device 31 further includes a first back dielectric body 315 and a first shielding body 316. The first tertiary containment unit 314 has a front surface (first surface) 314A opposed to the power receiving device 32, and a back surface (second surface) 314B on an opposite side to the front surface 314A. The first back dielectric body 315 is provided on the back surface 314B of the first tertiary containment unit 314.

The power receiving device 32 includes a receiving coil (second coil) 321, a second primary containment unit 322, a second secondary containment unit 323, and a third receiving side containment unit 324. The third receiving side containment unit 324 may be referred to as a second tertiary containment unit 324 in some cases (the same applies to a third receiving side containment unit 624). The second primary containment unit 322 has a first dielectric body that covers the receiving coil 321. The second secondary containment unit 323 has a second dielectric body that covers the second primary containment unit 322. The second tertiary containment unit 324 has a third dielectric body that covers the second secondary containment unit 323. More specifically, the front surface 322A, the back surface 322B, and the side surface 322C of the second primary containment unit 322 are covered by the second secondary containment unit 323. The front surface 323A, the back surface 323B, and the side surface 323C of the second secondary containment unit 323 are covered by the second tertiary containment unit 324. The power receiving device 32 further includes a second back dielectric body 325 and a second shielding body 326. The second tertiary containment unit 324 has a front surface (first surface) 324A opposed to the power transmitting device 31, and a back surface (second surface) 324B on an opposite side to the front surface 324B. The second back dielectric body 325 is provided on the back surface 324B of the second tertiary containment unit 324.

The first shielding body 316 and the second shielding body 326 are disposed at positions that prevent reduction to the highest possible extent in the transmission efficiency of electric power transmission performed by the power transmitting device 31 and the power receiving device 32.

The first tertiary containment unit 314 and the second tertiary containment unit 324 are collectively referred to as a coat unit.

The first primary containment unit 312, the first tertiary containment unit 314, the first back dielectric body 315, the second primary containment unit 322, the second tertiary containment unit 324, and the second back dielectric body 325 may be formed from a dielectric body with a relative permittivity of approximately 2 to 20 and a dielectric loss tangent of 0.01 or less, such as polyethylene, polyimide, polyamide, fluorine resin, and acrylic.

The first secondary containment unit 313 and the second secondary containment unit 323 are formed from a liquid having a specific gravity equal to that of the good conductor medium 33 (seawater) and a low electric conductivity (such as deionized water and distilled water). With this type of configuration, the first secondary containment unit 313 and the second secondary containment unit 323 serve as neutral buoyancy in the good conductor medium 33 (seawater) that prevents them from floating or sinking. If the first secondary containment unit 313 or the second secondary containment unit 323 has neutral buoyancy, then the power transfer system 5 will not require a special mechanism for specific gravity adjustment in the case of floating or sinking in seawater. Accordingly, the power transfer system 5 can be realized at low cost.

The first tertiary containment unit 314 composed of the third dielectric body physically confines therein the first secondary containment unit 313, which is of a form of liquid. The second tertiary containment unit 324 composed of the third dielectric body physically confines therein the second secondary containment unit 323, which is of a form of liquid.

In the power transfer system 5 of the fifth exemplary embodiment, the relative permittivity of the first dielectric body that forms the first primary containment unit 312, the relative permittivity of the second dielectric body that forms the first secondary containment unit 313, the relative permittivity of the third dielectric body that forms the first tertiary containment unit 314, and the relative permittivity of the first back dielectric body 315 may be different or may be the same. The dielectric loss tangent of the first dielectric body that forms the first primary containment unit 312, the dielectric loss tangent of the second dielectric body that forms the first secondary containment unit 313, the dielectric loss tangent of the third dielectric body that forms the first tertiary containment unit 314, and the dielectric loss tangent of the first back dielectric body 315 may be different or may be the same.

Similarly, in the power transfer system 5 of the fifth exemplary embodiment, the relative permittivity of the first dielectric body that forms the second primary containment unit 322, the relative permittivity of the second dielectric body that forms the second secondary containment unit 323, the relative permittivity of the third dielectric body that forms the second tertiary containment unit 324, and the relative permittivity of the second back dielectric body 325 may be different or may be the same. The dielectric loss tangent of the first dielectric body that forms the second primary containment unit 322, the dielectric loss tangent of the second dielectric body that forms the second secondary containment unit 323, the dielectric loss tangent of the third dielectric body that forms the second tertiary containment unit 324, and the dielectric loss tangent of the second back dielectric body 325 may be different or may be the same.

At least either one of the first back dielectric body 315 and the second back dielectric body 325 may be air.

In the power transfer system 5 shown in FIG. 14, the power transmitting device 31 and the power receiving device 32 both include a primary containment unit and secondary containment unit similar to those described above. However, it is not limited to this configuration example. Only either one of the power transmitting device 31 and the power receiving device 32 may include a primary containment unit and secondary containment unit. The power transfer system 5 of the fifth exemplary embodiment may include the impedance adjustment unit described in the first exemplary embodiment.

Next, specific operations of the power transfer system 5 according to the fifth exemplary embodiment are described.

Here is assumed a case where the first shielding body 316 and the second shielding body 326 hardly cause a reduction in the transmission efficiency of electric power transmission performed by the power transmitting device 31 and the power receiving device 32. For this reason, the first shielding body 316 and the second shielding body 326 are considered as having no relation to the propagation efficiency of electric power transmitted from the power transmitting device 31 to the power receiving device 32. Therefore they are omitted in the following description of the power transfer system 5.

First, an alternating power supply (not shown in the figure) of the power transmitting device 31 outputs alternating current power at a predetermined frequency. Next, the alternating current power that has been output, is supplied to the transmission coil 311. The transmission coil 311 transmits the alternating current power to the outside (good conductor medium 33) as electromagnetic energy. The receiving coil 321 of the power receiving device 32 receives the transmitted electromagnetic energy. Here, the combined impedance of each impedance of the power transmitting device 31, the power receiving device 32, and the good conductor medium 33 is adjusted so that the transmission coil 311 and the receiving coil 321 resonate at the frequency of transmitted electric power. The electric power that has been received by the receiving coil 321 is input to a converter (not shown in the figure). The energy that has been converted from alternating current to direct current by this converter is supplied to the target object of the purpose (such as a secondary battery and a sensor). This completes the process of electric power transmission.

In the power transfer system 5 according to the fifth exemplary embodiment, by having electric power transmission made at a resonance frequency that is determined by the combined impedance of the respective impedances of the power transmitting device 31, the power receiving device 32, and the good conductor medium 33, the level of electric power input to the receiving coil 321 can be made a maximum. In the power transfer system 5 according to the fifth exemplary embodiment, the first shielding body 215 and the second shielding body 225 are capable of shielding devices outside the power transmitting device 21 and the power receiving device 22 against electromagnetic field leakage generated by the power transmitting device 21 and the power receiving device 22.

Moreover, the first secondary containment unit 313 and the second secondary containment unit 323 suppress the electric field from spreading into the good conductor medium 33. As a result, it is possible to suppress electromagnetic energy that diffuses and becomes lost in the good conductor medium 33. Moreover, the first primary containment unit 312 and the second primary containment unit 322 have an effect of reducing dielectric loss in close proximity to the transmission coil 311 and the receiving coil 321.

Accordingly, the power transfer system 5 of the fifth exemplary embodiment requires no special specific gravity adjustment mechanism. Therefore, the power transfer system 5 can be realized at lower cost compared to the power transfer systems 1 through 4 of the first through fourth exemplary embodiments. Furthermore, in the power transfer system 5 according to the fifth exemplary embodiment, the first shielding body 316 and the second shielding body 326 shield against electromagnetic field leakage generated by the power transmitting device 31 and the power receiving device 32. Thereby it is possible to prevent malfunction or failure of the control circuit as a result of being influenced by the electromagnetic field leaked from the power transmitting device 31 and the power receiving device 32.

Sixth Exemplary Embodiment

Figure 15:
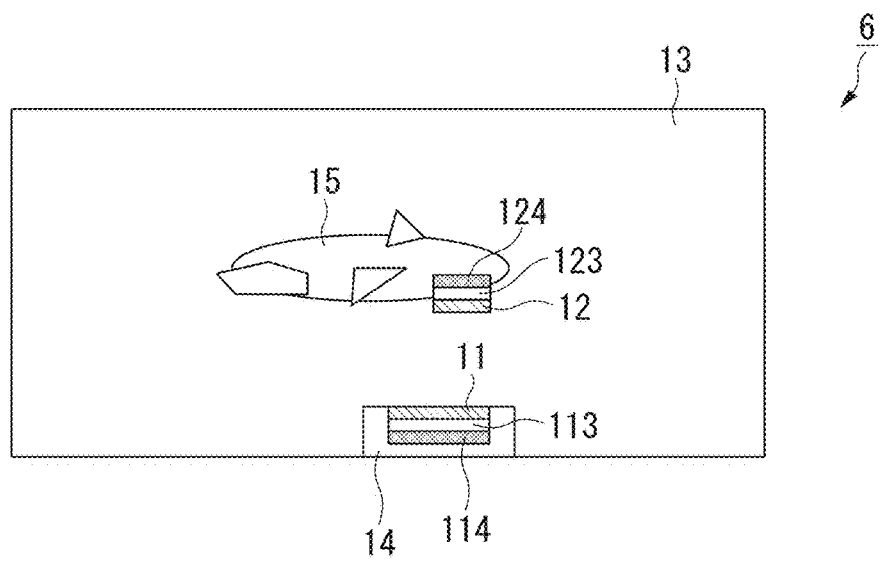
FIG. 15 is a diagram showing a configuration of a power transfer system according to a sixth exemplary embodiment of the present invention.

FIG. 15 is a diagram showing a configuration of a power transfer system 6 according to a sixth exemplary embodiment of the present invention.

As shown in FIG. 15, in the power transfer system 6 of the sixth exemplary embodiment, a power supply source 14 includes a power transmitting device 11, a first back dielectric body 113, and a first shielding body 114. A submarine 15 includes a power receiving device 12, a second back dielectric body 123, and a second shielding body 124. According to the power transfer system 6, even in a case where the positional relationship between the power supply source 14 and the submarine 15 changes from being in an almost intimate contact state due to the occurrence of a tidal current, the magnetic field that arises from the electric current flowing through a predetermined good conductor medium 13 and the coil creates an eddy current in the good conductor medium 13, and this eddy current repeatedly creates a new magnetic field. As a result, the electric field and magnetic field can be made substantially parallel with the coil surface, making it possible to perform stable electric power supply at a high level of electric power transmission efficiency.

Seventh Exemplary Embodiment

Figure 16:
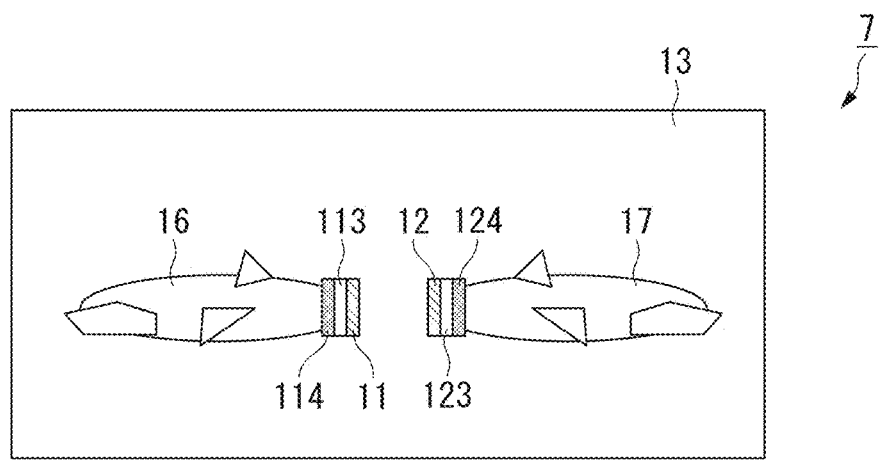
FIG. 16 is a diagram showing a configuration of a power transfer system according to a seventh exemplary embodiment of the present invention.

FIG. 16 is a diagram showing a configuration of a power transfer system 7 according to a seventh exemplary embodiment of the present invention.

As shown in FIG. 16, in the power transfer system 7 of the seventh exemplary embodiment, a submarine 16 includes a power transmitting device 11, a first back dielectric body 113, and a first shielding body 114. A submarine 17 includes a power receiving device 12, a second back dielectric body 123, and a second shielding body 124. According to the power transfer system 7 of the seventh exemplary embodiment, even in a case where the positional relationship between the submarine 16 and the submarine 17 changes from being in an almost intimate contact state due to the occurrence of a tidal current, the magnetic field that arises from the electric current flowing through a predetermined good conductor medium 13 and the coil creates an eddy current in the good conductor medium 13, and this eddy current repeatedly creates a new magnetic field. As a result, the electric field and magnetic field can be made substantially parallel with the coil surface, making it possible to perform stable electric power supply at a high level of electric power transmission efficiency.

In the submarine 16 and the submarine 17, by using the power transmitting device 11 as a power receiving device and using the power receiving device 12 as a power transmitting device, electric power supply can be performed bi-directionally. As another method, each of the submarine 16 and the submarine 17 may include both a power transmitting device 11 and a power receiving device 12.

The submarine 17 including the power receiving device 12 may be a sensor device or the like that is installed on a marine vessel or on the seafloor.

Eighth Exemplary Embodiment

Figure 17:
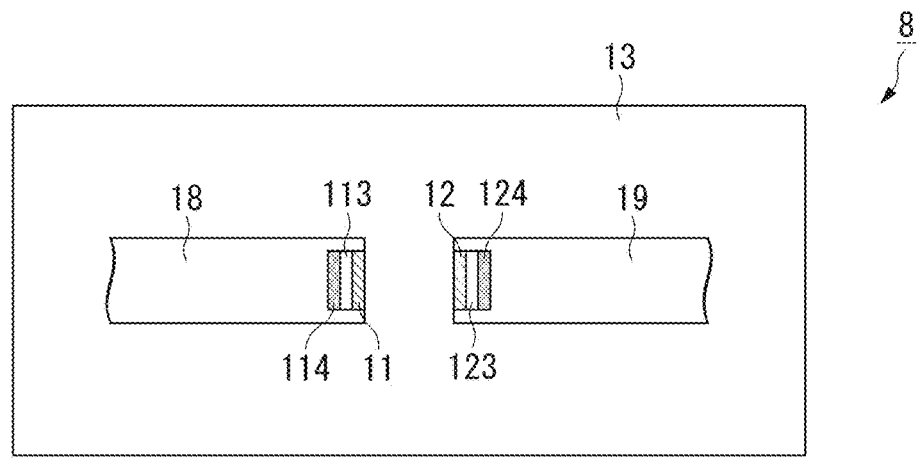
FIG. 17 is a diagram showing a configuration of a power transfer system according to an eighth exemplary embodiment of the present invention.

FIG. 17 is a diagram showing a configuration of a power transfer system 8 according to an eighth exemplary embodiment of the present invention.

As shown in FIG. 17, in the power transfer system 8 according to the eighth exemplary embodiment, the power transmitting device 11, the first back dielectric body 113, and the first shielding body 114 are included in a connection unit of a power cable 18. A power receiving device 12, a second back dielectric body 123, a second shielding body 124 are included in a connection unit of a power cable 19. According to the power transfer system 8 of the eighth exemplary embodiment, even in seawater (good conductor medium 13), connection can be established between the power cables in a contactless manner by wirelessly performing electric power supply. As a result, the power cables can be replaced easily, will not become worn, and reliability is improved.

In the power cable 18 and the power cable 19, by using the power transmitting device 11 as a power receiving device and using the power receiving device 12 as a power transmitting device, electric power supply can be performed bi-directionally. Each of the power cable 18 and the power cable 19 may include both a power transmitting device 11 and a power receiving device 12.

The power transmitting device 11 and the power receiving device 12 of the power transfer system 8 may have a function of performing information communication wirelessly. By using the power transmitting device 11 as a transmitter and the power receiving device 12 as a receiver, the need for separately providing a wireless communication mechanism can be eliminated. By using the common mechanism for information communication and electric power transmission, the power transfer system 8 can be used as a small-size and low-cost communication system.

First Example

Figure 18:
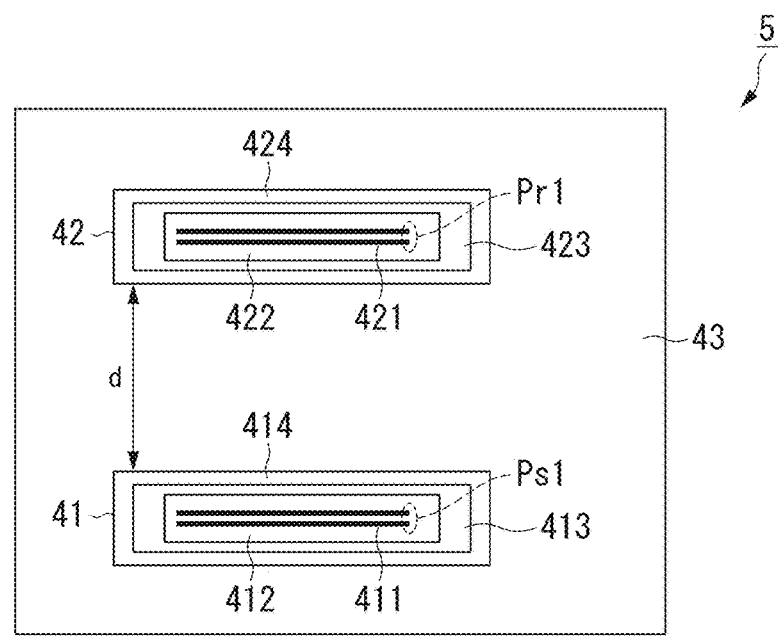
FIG. 18 is a diagram showing a simulation model for verifying the effect of the power transfer system according to the fifth exemplary embodiment of the present invention.

FIG. 18 is a diagram showing a simulation model for verifying the effect of the power transfer system 5 according to the fifth exemplary embodiment of the present invention.

Next is described a simulation that has verified the effect of the power transfer system 5 according to the fifth exemplary embodiment, that uses the simulation model of FIG. 18.

Here is assumed a case where the first shielding body 416 and the second shielding body 426 hardly cause a reduction in the transmission efficiency of electric power transmission performed by the power transmitting device 41 and the power receiving device 42. For this reason, the first shielding body 416 and the second shielding body 426 are considered as having no relation to the propagation efficiency of electric power transmitted from the power transmitting device 41 to the power receiving device 42. Therefore, the first shielding body 416 and the second shielding body 426 are omitted in the following description of the power transfer system 5.

As shown in FIG. 18, the power transfer system 5 of the fifth exemplary embodiment includes a power transmitting device 41 and a power receiving device 42. The power transmitting device 41 and the power receiving device 42 are covered by seawater 43 that serves as a good conductor medium. The power transmitting device 41 includes a helical coil (transmission coil, first coil) 411 having a power supply port Ps1, an internal dielectric body (first transmission side containment unit, first primary containment unit) 412, an external dielectric body (second transmission side containment unit, first secondary containment unit) 413, and a coati dielectric body (third transmission side containment unit, first tertiary containment unit) 414. The power receiving device 42 includes a helical coil (receiving coil, second coil) 421 having a power supply port Pr1, an internal dielectric body (first receiving side containment unit, first secondary containment unit) 422, an external dielectric body (second receiving side containment unit, first secondary containment unit) 423, and a coating dielectric body (third receiving side containment unit, second tertiary containment unit) 424.

Figure 19:
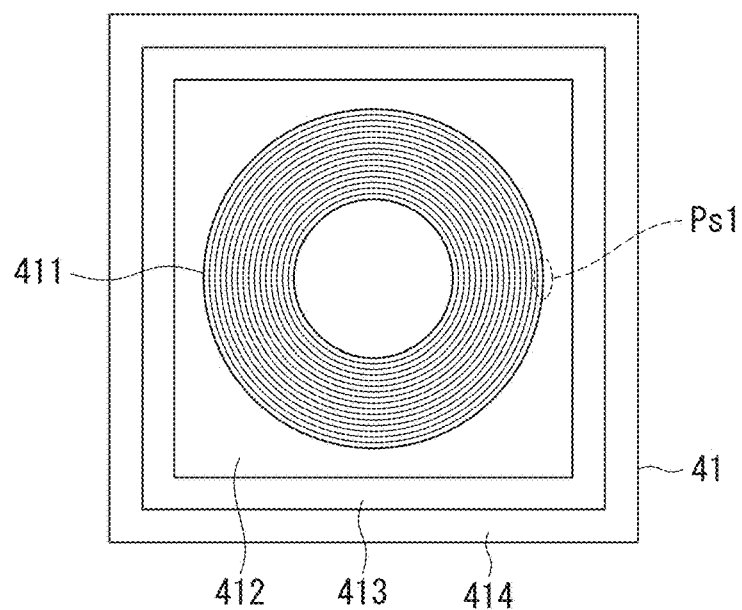
FIG. 19 is a schematic top view of a power transmitting device in a first example of the present invention.

FIG. 19 is a schematic top view of a power transmitting device 41 in the first example of the present invention.

As shown in FIG. 19, the helical coil 411 is of a structure such that two single-layer spiral coils each formed from a 2 [mm] diameter conductor wire wound 29 times to give 220 [mm] outer diameter and 100 [mm] inner diameter, are opposed to each other while having a 3 [mm] distance therebetween. A power supply port Ps1 is an electric power application terminal for generating an electric field in the coil. Alternating current power is applied from the power supply port Ps1 to these helical coils 411 that are opposed to each other. The internal dielectric body 412 is configured with a fluorine resin. The coating dielectric body 414 is configured with an acrylic material. The dimensions of the coating dielectric body 414 are 255 [mm] long, 255 [mm] wide, and 19 [mm] high. The resonance frequency of the power transfer system 5 is approximately 1 [MHz]. Here, in the present example, the power transfer system 5 obtains a sufficiently high level of electric power transmission efficiency even when the ratio of the outer diameter size d2 of the spiral coil 411 to the size d1 of the coating dielectric body is 1.16 (d1/d2), which is greater than 1. If the ratio (d1/d2) is made greater than 1.16, the power transfer system 5 can achieve even higher electric power transmission efficiency.

The configuration of the power receiving device 42 is the same as that of the power transmitting device 41. However, the configuration shown here is merely an example, and the power transmitting device 41 and the power receiving device 42 need not be of the same configuration.

Figure 20:
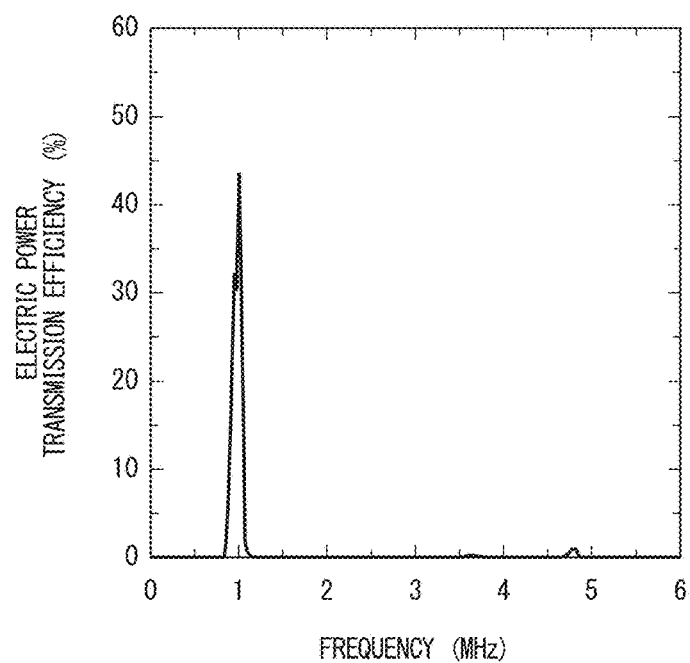
FIG. 20 is a diagram showing electric power transmission efficiency simulation results in the first example of the present invention.

FIG. 20 is a diagram showing electric power transmission efficiency simulation results in the first example of the present invention.

An electric power transmission efficiency simulation was carried out in seawater where the distanced between the power transmitting device 41 and the power receiving device 42 was 10 [cm]. As a result, as shown in FIG. 20, the electric power transmission efficiency showed a high value, which was 40 [%] or more, where the electric power transmission frequency (f) was in the proximity of 1 [MHz].

Figure 21:
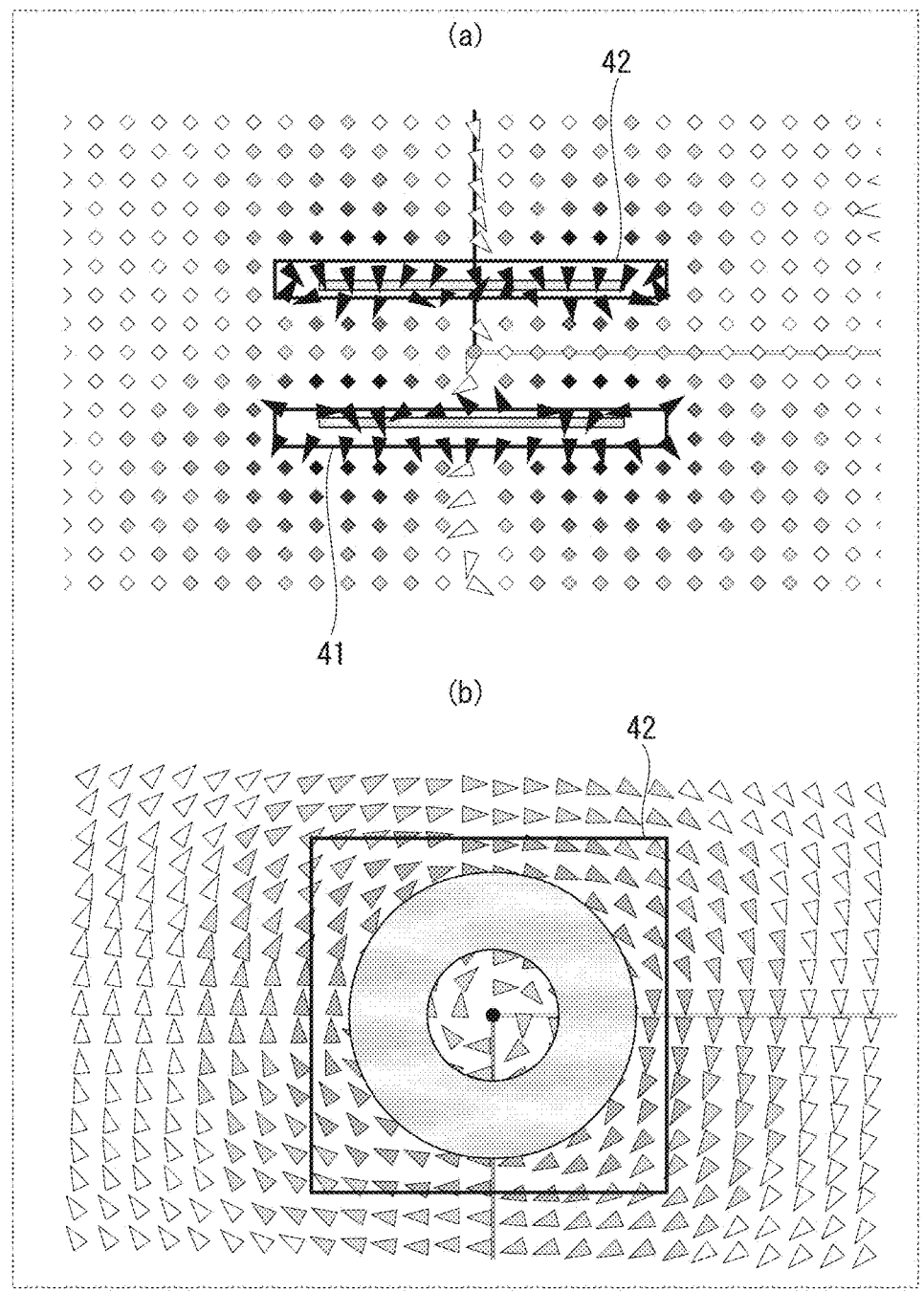
FIG. 21 is a diagram showing the electric field in close proximity to the power transmitting device and the power receiving device, in a three dimensional electromagnetic field simulation of the first example of the present invention.

FIG. 21 is a diagram showing the electric field in close proximity to the power transmitting device 41 and the power receiving device 42, in a three dimensional electromagnetic field simulation of the first example of the present invention. Part (a) of FIG. 21 shows a side sectional view. Part (b) of FIG. 21 shows a plan sectional view.

Figure 22:
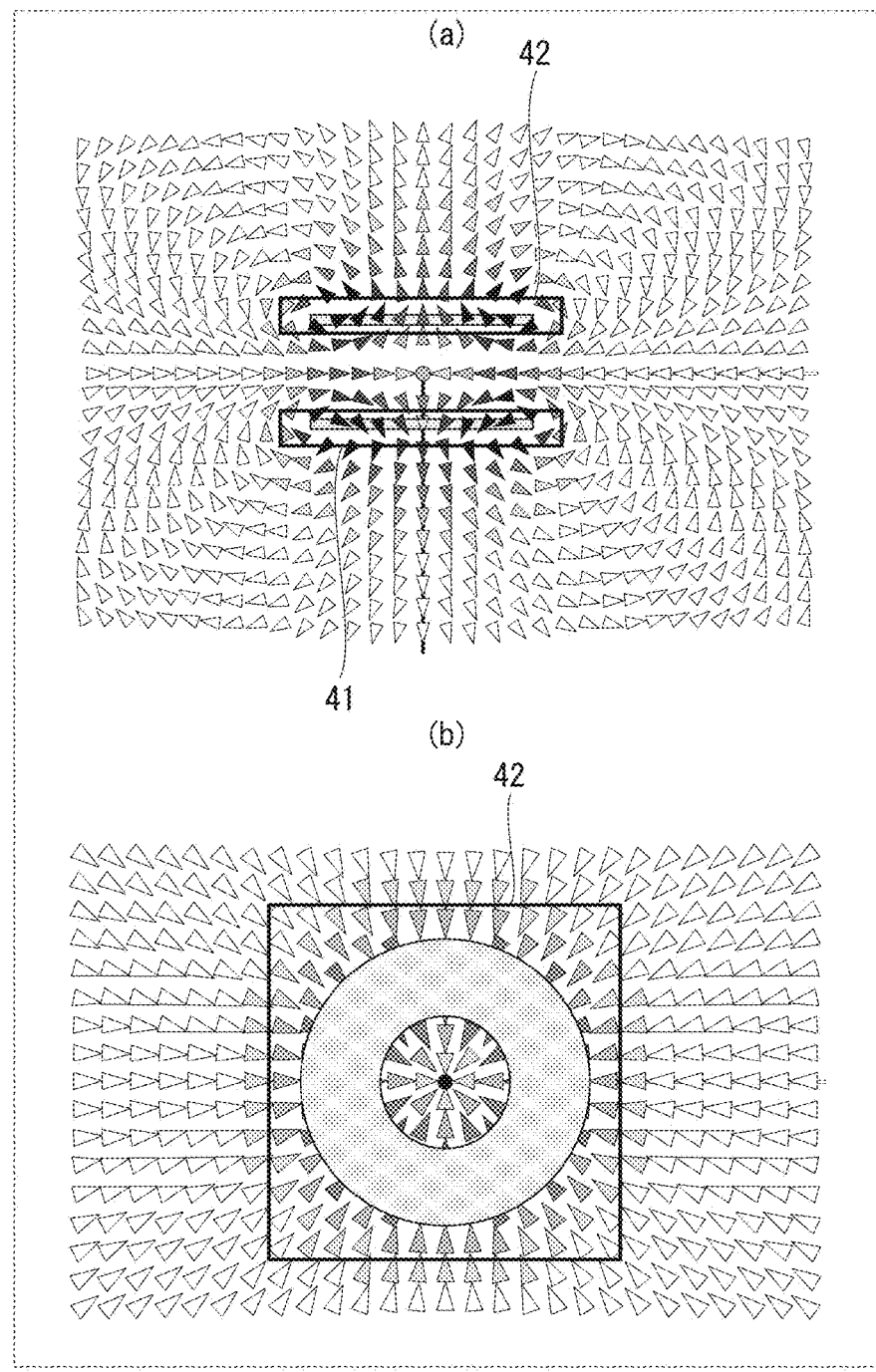
FIG. 22 is a diagram showing the magnetic field in close proximity to the power transmitting device 41 and the power receiving device, in a three dimensional electromagnetic field simulation of the first example of the present invention.

FIG. 22 is a diagram showing the magnetic field in close proximity to the power transmitting device 41 and the power receiving device 42, in a three dimensional electromagnetic field simulation of the first example of the present invention. Part (a) of FIG. 22 shows a side sectional view. Part (b) of FIG. 22 shows a plan sectional view.

Figure 23:
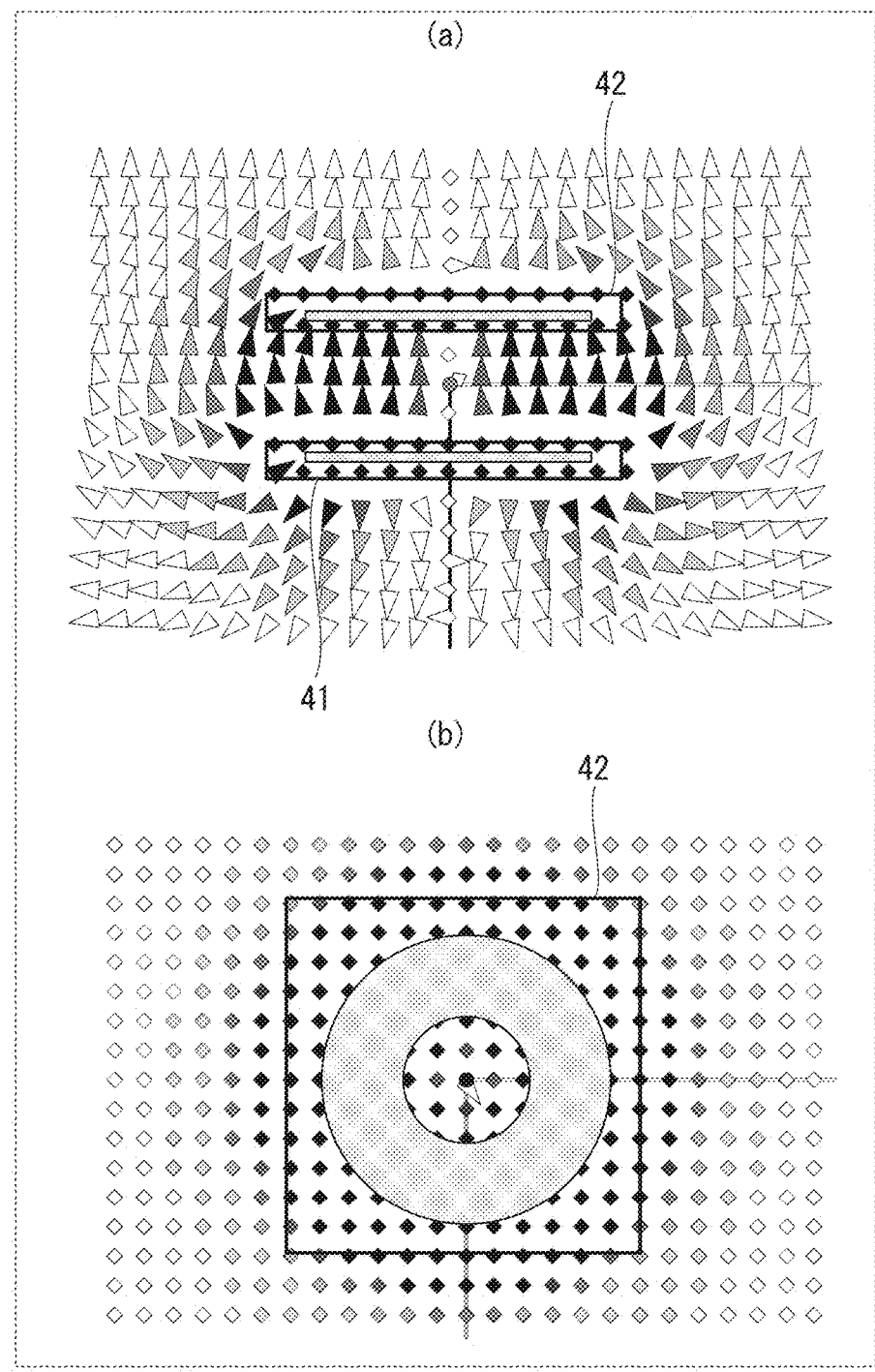
FIG. 23 is a diagram showing pointing vectors in close proximity to the power transmitting device and the power receiving device, in the three dimensional electromagnetic field simulation of the first example of the present invention.

FIG. 23 is a diagram showing pointing vectors in close proximity to the power transmitting device 41 and the power receiving device 42, in the three dimensional electromagnetic field simulation of the first example of the present invention. Part (a) of FIG. 23 shows a side sectional view. Part (b) of FIG. 23 shows a plan sectional view.

The electric field in close proximity to the power transmitting device 41 and the power receiving device 42 in the three dimensional electromagnetic field simulation of the first example, is rotating along the surface parallel with the coil surface as shown in FIG. 21. The magnetic field is generated in a radial manner along the surface parallel with the coil surface as shown in FIG. 22. The pointing vector (energy flow) occurs in the direction substantially perpendicular to the coil surface as shown in FIG. 23, based on the flow of these electric field and magnetic field. As a result, even in seawater where the power transmitting device 41 and the power receiving device 42 are distanced from each other by approximately 10 [cm], an energy flow is formed in the direction substantially perpendicular to the coil surface, and an increase in the distance in seawater becomes possible. Moreover, in the power transfer system 5 of the present example, the first shielding body 416 and the second shielding body 426 shield against electromagnetic field leakage generated by the power transmitting device 41 and the power receiving device 42. As a result, it is possible to prevent malfunction or failure of the control circuit as a result of being influenced by the electromagnetic field leaked from the power transmitting device 41 and the power receiving device 42.

Figure 24:
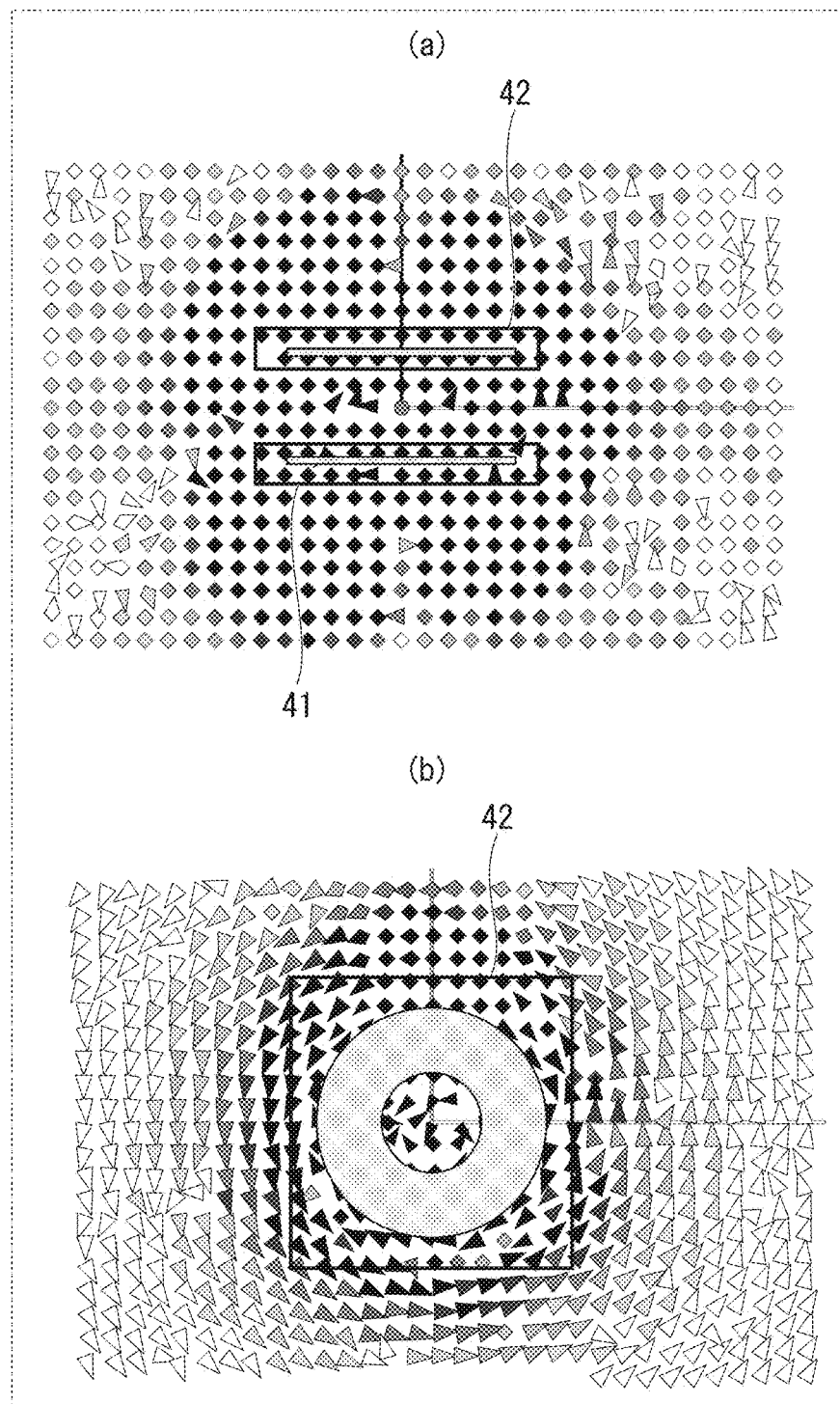
FIG. 24 is a diagram showing pointing vector simulation results in the case of changing the medium used in the power transfer system according to the first example of the present invention, from seawater to air.

FIG. 24 is a diagram showing pointing vector simulation results in the case of changing the medium used in the power transfer system 5 according to the first example of the present invention, from seawater to air. Part (a) of FIG. 24 shows a side sectional view. Part (b) of FIG. 24 shows a plan sectional view.

FIG. 24 shows the pointing vector simulation results for when the power transmitting device 41 and the power receiving device 42 of the power transfer system 5 of the present example are distanced from each other by 10 [cm] in air.

As can be seen from the FIG. 24A and FIG. 24B, when the medium used in the power transfer system 5 of the first example is changed from seawater to air, no energy flow that is perpendicular the power transmitting/receiving device surfaces occurs, and energy flows in a spiral shape. That is to say, the phenomenon in which an energy flow that is substantially perpendicular to the coil surface occurs, is a phenomenon unique to energy that propagates in a good conductor medium, and it is a phenomenon that does not occur when propagation takes place in air. The exemplary embodiments of the present invention utilize the phenomenon unique to energy that propagates in a good conductor medium in which energy flows substantially perpendicular to the coil surface.

Figure 25:
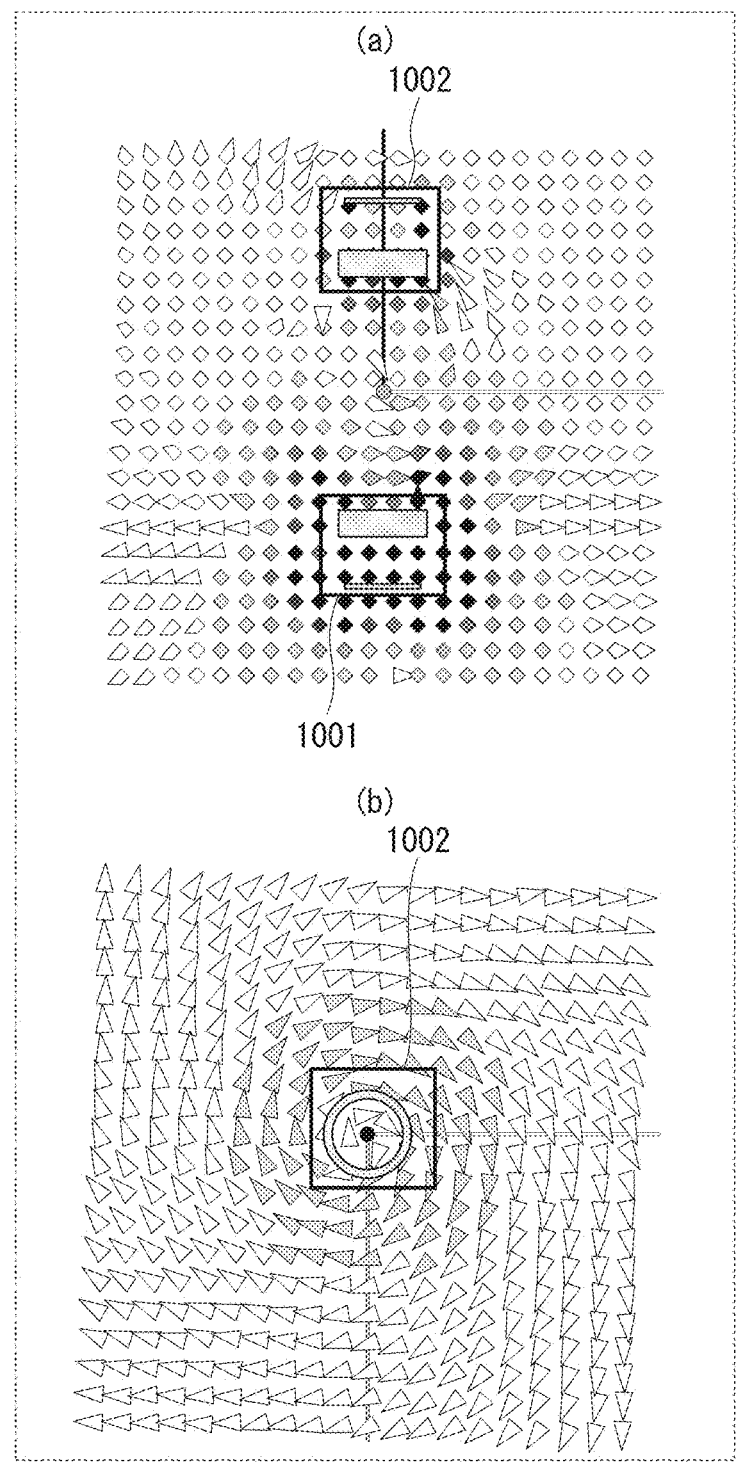
FIG. 25 is a diagram showing the results of a pointing vector simulation in air in the case of using a relevant magnetic field resonance technique.

FIG. 25 is a diagram showing the results of a pointing vector simulation in air in the case of using a relevant magnetic field resonance technique. Part (a) of FIG. 25 shows a side sectional view of a power transmitting device 1001 and a power receiving device 1002 seen from side. Part (b) of FIG. 25 shows a plan sectional view of the power transmitting device 1001 and the power receiving device 1002 seen from above.

As can be seen from the FIG. 25, also in the case of using the relevant magnetic field resonance technique, as with the case of FIG. 24, no energy flow that is perpendicular the coil surface occurs, and energy flows in a spiral shape. However, the electric power transmission efficiency in the case of FIG. 25 is 90 [%]. As has been described, even if wireless electric power transmission is carried out in seawater with use of the power transfer system of this relevant technique, a high level of electric power transmission efficiency cannot be achieved. Specifically, from the simulation results, it has been revealed that an electric power transmission efficiency of only approximately 10 [%] can be achieved with a 10 [cm] distance.

The magnetic field under the phase condition where the interlinkage magnetic flux that passes through the transmission coil of the power transmitting device 1001 and the receiving coil of the power receiving device 1002 becomes a maximum, is the same as the magnetic field in close proximity to the power transmitting device 41 and the power receiving device 42 in the three dimensional electromagnetic field simulation of the present example shown in FIG. 22.

Below is a description of the point of physical difference between the relevant magnetic field resonance technique and the power transfer system 5 of the present example.

In the power transfer system 5 of the present example, as shown in FIG. 22, the interlinkage magnetic flux passing through the transmission coil 411 of the power transmitting device 41, and the interlinkage magnetic flux passing through the receiving coil 421 of the power receiving device 42 are facing mutually opposite directions. Thereby the magnetic field becomes a maximum and a magnetic field parallel with the coil surface is generated.

On the other hand, it is commonly known that in the relevant wireless power transmission technique that uses relevant magnetic field resonance, the resonance frequency is divided into two in the case of being closely coupled, and the phase of the interlinkage magnetic flux passing through the coil of the power transmitting device 1001 and the power receiving device 1002 becomes a reversed phase at the higher resonance frequency. Moreover, it is commonly known that in the state of being loosely coupled where the resonance frequency is not divided, the phase of the interlinkage magnetic flux passing through the coil of the power transmitting device 1001 and the power receiving device 1002 becomes the same phase.

The present example differs from the relevant magnetic field resonance technique in that in the state of being loosely coupled where the resonance frequency is not divided, rather than being closely coupled, the phase of the interlinkage magnetic flux that passes through the transmission coil 411 of the power transmitting device 41 and the receiving coil 421 of the power receiving device 42 becomes a reversed phase.

Second Example

Figure 26:
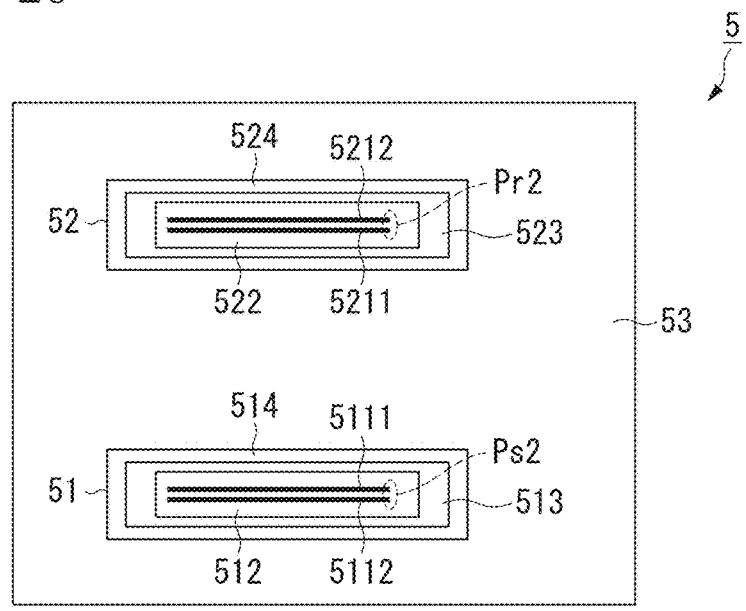
FIG. 26 is a diagram showing a simulation model for verifying the effect of the power transfer system according to the fifth exemplary embodiment of the present invention.

FIG. 26 is a diagram showing a simulation model for verifying the effect of the power transfer system 5 according to the fifth exemplary embodiment of the present invention.

Next is described a simulation that has verified the effect of the power transfer system 5 according to the fifth exemplary embodiment, that uses the simulation model of FIG. 26.

Here is assumed a case where the first shielding body 516 and the second shielding body 526 hardly cause a reduction in the transmission efficiency of electric power transmission performed by the power transmitting device 51 and the power receiving device 52. For this reason, the first shielding body 516 and the second shielding body 526 are considered as having no relation to the propagation efficiency of electric power transmitted from the power transmitting device 51 to the power receiving device 52. Therefore, the first shielding body 516 and the second shielding body 526 are omitted in the following description of the power transfer system 5.

As shown in FIG. 26, the power transfer system 5 of the fifth exemplary embodiment includes a power transmitting device 51 and a power receiving device 52. The power transmitting device 51 and the power receiving device 52 are covered by seawater 53 that serves as a good conductor medium. The power transmitting device 51 includes a spiral coil 5111, a loop coil 5112 having a power supply port Ps2, an internal dielectric body (first primary containment unit) 512, an external dielectric body (first secondary containment unit) 513, and a coating dielectric body (first tertiary containment unit) 514. The power receiving device 52 includes a spiral coil 5211, a loop coil 5212 having a power supply port Pr2, an internal dielectric body (first secondary containment unit) 522, an external dielectric body (first secondary containment unit) 523, and a coating dielectric body (second tertiary containment unit) 524.

Figure 27:
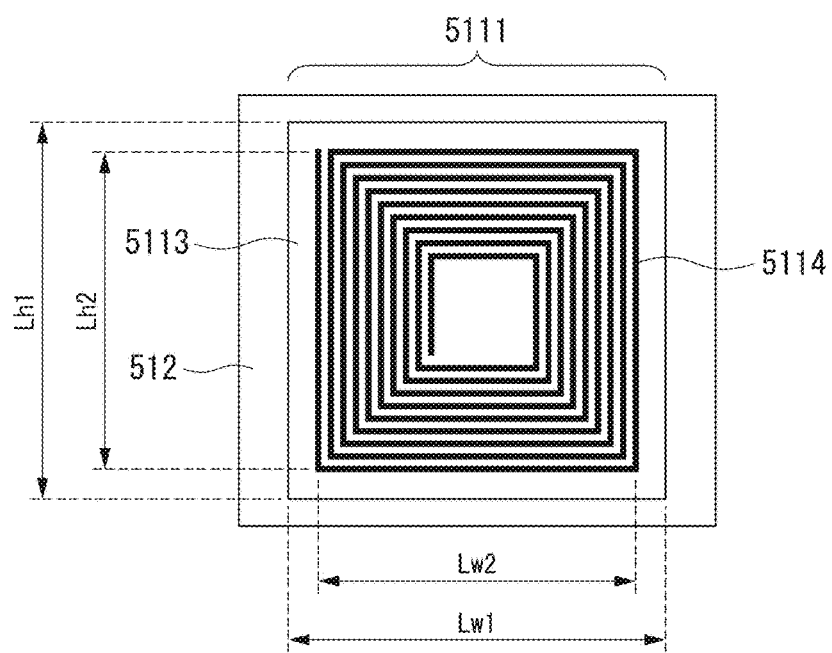
FIG. 27 is a schematic top view of a spiral coil in a second example of the present invention.

FIG. 27 is a schematic top view of the spiral coil 5111 in the second example of the present invention.

Figure 28:
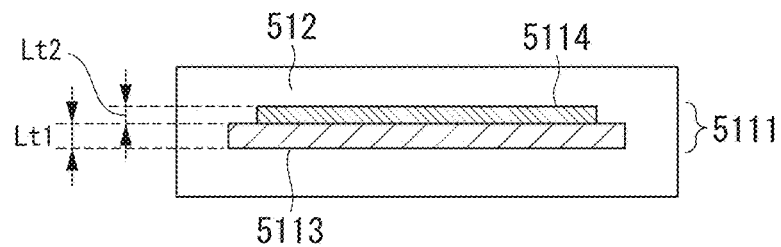
FIG. 28 is a schematic side view of the spiral coil in the second example of the present invention.

FIG. 28 is a schematic side view of the spiral coil 5111 in the second example of the present invention.

The spiral coil 5111 is formed from a dielectric substrate 5113 composed of a fluorine resin and a spiral wiring 5114 composed of metal wiring. The dielectric substrate 5113 has thickness Lt1 of 1 [mm], height Lh1 of 270 [mm], and width Lw1 of 270 [mm]. The spiral wiring 5114 has height Lh2 of 260 [mm], width Lw2 of 260 [mm], wiring width 6 [mm], and thickness Lt2 of 50 [μm], and the spiral wiring 5114 is a 10-time wound wiring.

The spiral coil 5211 has dimensions similar to those of the spiral coil 5111. However, the dimensions shown here are merely an example, and the spiral coil 5111 and the spiral coil 5211 do not have to be of the same dimensions.

Figure 29:
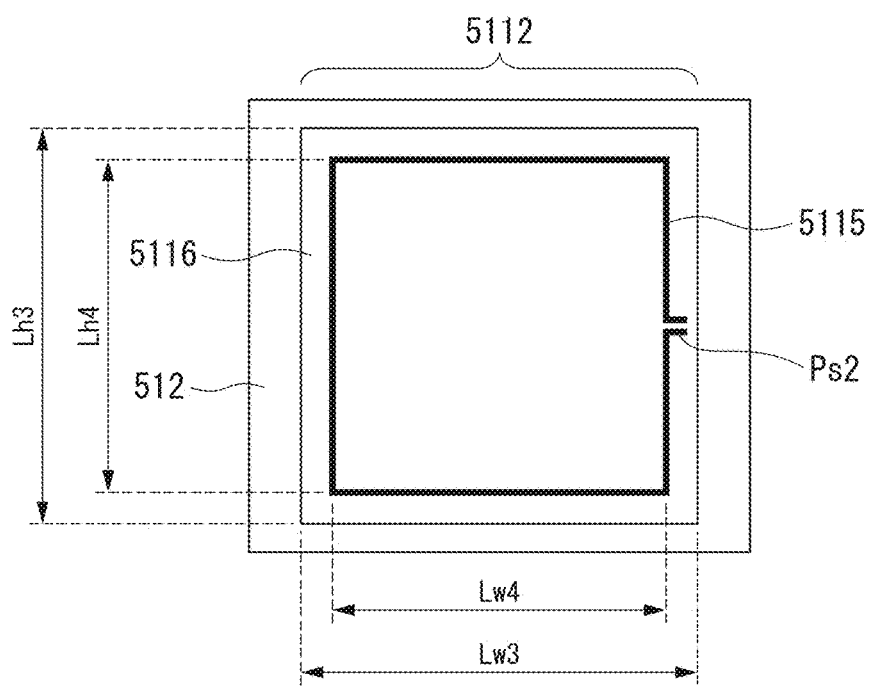
FIG. 29 is a schematic top view of a loop coil in the second example of the present invention.

FIG. 29 is a schematic top view of the loop coil 5112 in the second example of the present invention.

Figure 30:
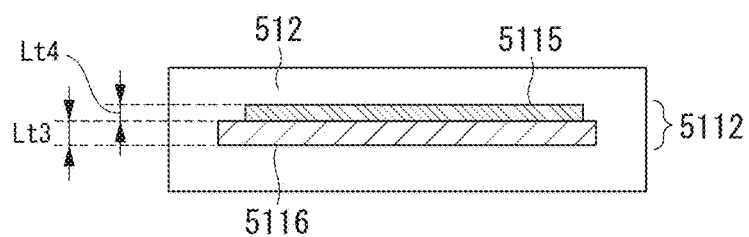
FIG. 30 is a schematic side view of the loop coil in the second example of the present invention.

FIG. 30 is a schematic side view of the loop coil 5112 in the second example of the present invention.

The loop coil 5112 is formed from a dielectric substrate 5115 composed of a fluorine resin and a loop wiring 5116 composed of metal wiring. The dielectric substrate 5115 has thickness Lt3 of 1 [mm], height Lh3 of 270 [mm], and width Lw3 of 270 [mm]. The loop wiring 5116 has height Lh4 of 260 [mm], width Lw4 of 260 [mm], wiring width of 6 [mm], and thickness Lt4 of 50 [μm].

The loop coil 5212 has dimensions similar to those of the loop coil 5112. However, the dimensions shown here are merely an example, and the loop coil 5112 and the loop coil 5212 do not have to be of the same dimensions.

The spiral coil 5111 and the loop coil 5112 are distanced from each other by 3 mm within the internal dielectric body 512. An electric power transmission efficiency simulation was carried out in seawater where the distance d between the power transmitting device 51 and the power receiving device 52 was 10 [cm]. As a result, the electric power transmission efficiency showed a high value, which was 55 [%] or more, where the electric power transmission frequency f was in the proximity of 1 [MHz].

In the present example, the power receiving device 52 is of the same configuration as that of the power transmitting device 51. However, the configuration shown here is merely an example, and the power transmitting device 51 and the power receiving device 52 need not be of the same configuration.

By having the coils formed on a dielectric substrate as practiced in the present example, the level of mass-productiveness increases, and the level of manufacturing precision increases, while reducing characteristic variation in each product. As a result, the resonance frequencies of the power transmitting device 51 and the power receiving device 52 can be made the same, and a higher level of electric power transmission efficiency can be achieved. As a result, it is possible to increase the distance of wireless electric power transmission within the good conductor medium such as seawater. Moreover, in the power transfer system 5 of the present example, the first shielding body 516 and the second shielding body 526 shield against electromagnetic field leakage generated by the power transmitting device 51 and the power receiving device 52. As a result, it is possible to prevent malfunction or failure of the control circuit as a result of being influenced by the electromagnetic field leaked from the power transmitting device 51 and the power receiving device 52.

Third Example

Figure 31:
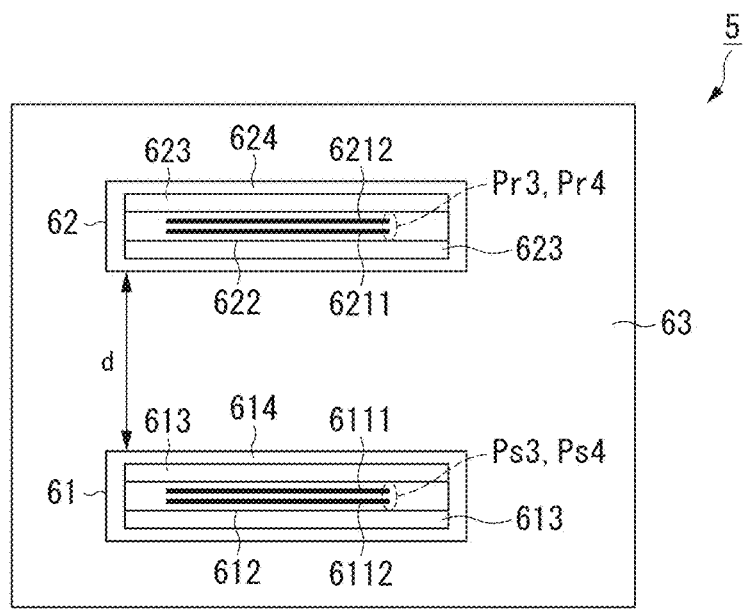
FIG. 31 is a diagram showing a simulation model for verifying the effect of the power transfer system according to the fifth exemplary embodiment of the present invention.

FIG. 31 is a diagram showing a simulation model for verifying the effect of the power transfer system 5 according to the fifth exemplary embodiment of the present invention.

Next is described a simulation that has verified the effect of the power transfer system 5 according to the fifth exemplary embodiment, that uses the simulation model of FIG. 31.

Here is assumed a case where the first shielding body 616 and the second shielding body 626 hardly cause a reduction in the transmission efficiency of electric power transmission performed by the power transmitting device 61 and the power receiving device 62. For this reason, the first shielding body 616 and the second shielding body 626 are considered as having no relation to the propagation efficiency of electric power transmitted from the power transmitting device 61 to the power receiving device 62. Therefore, the first shielding body 616 and the second shielding body 626 are omitted in the following description of the power transfer system 5.

As shown in FIG. 31, the power transfer system 5 of the fifth exemplary embodiment includes a power transmitting device 61 and a power receiving device 62. The power transmitting device 61 and the power receiving device 62 are covered by seawater 63 that serves as a good conductor medium.

The power transmitting device 61 includes a transmission coil, a first primary containment unit 612, a first secondary containment unit 613, and a first tertiary containment unit 614. The transmission coil includes a spiral coil 6111 and a spiral coil 6112. The first primary containment unit 612 includes a first dielectric body that covers the transmission coil. The first secondary containment unit 613 includes a second dielectric body that covers the first primary containment unit 612. The first tertiary containment unit 614 includes a third dielectric body that covers the first secondary containment unit 613. The spiral coil 6111 has a power supply port Ps3. The spiral coil 6112 has a power supply port Ps4.

The power transmitting device 62 includes a receiving coil, a second primary containment unit 622, a second secondary containment unit 623, and a first tertiary containment unit 624. The receiving coil includes a spiral coil 6211 and a spiral coil 6212. The second primary containment unit 622 includes a first dielectric body that covers the receiving coil. The second secondary containment unit 623 includes a second dielectric body that covers the second primary containment unit 622. The first tertiary containment unit 624 includes a third dielectric body that covers the second secondary containment unit 623. The spiral coil 6211 has a power receiving port Pr3. The spiral coil 6212 has a power receiving port Pr4.

As shown in FIG. 31, in the simulation model in the present example, the first secondary containment unit 613 is of a structure in which it covers only the upper surface and lower surface of the first primary containment unit 612 (surfaces parallel with the coil surface). That is to say, the first primary containment unit 612 is of a structure of being sandwiched by the two first secondary containment units 613. On the other hand, the side surface (the surface perpendicular to the coil surface) of the first primary containment unit 612 is of a structure of being covered directly by the first tertiary containment unit 614.

Similarly, the second secondary containment unit 623 is of a structure to cover only the upper surface and lower surface (surfaces parallel with the coil surface) of the second primary containment unit 622. That is to say, the second primary containment unit 622 is of a structure of being sandwiched by the two second secondary containment units 623. On the other hand, the side surface (the surface perpendicular to the coil surface) of the second primary containment unit 622 is of a structure of being covered directly by the second tertiary containment unit 624.

Figure 32:
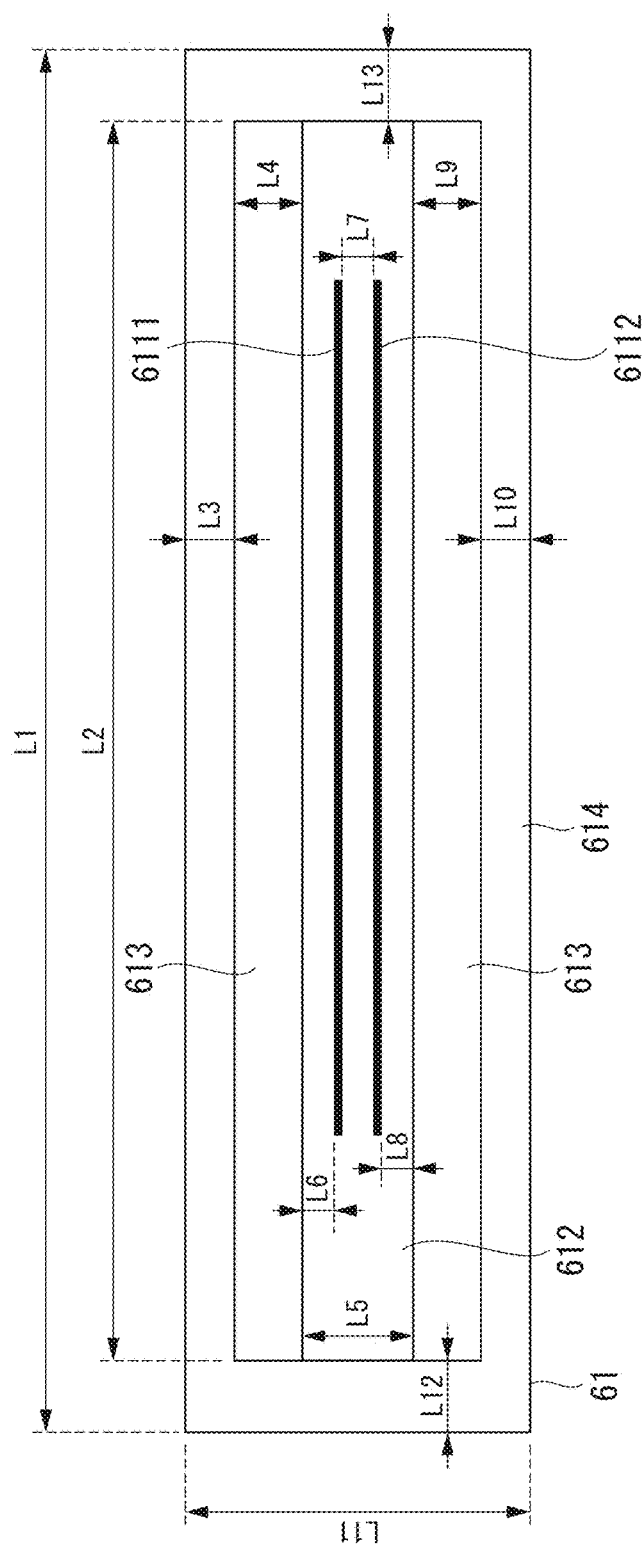
FIG. 32 is a schematic side view of a power transmitting device in a third example of the present invention.

FIG. 32 is a schematic side view of the power transmitting device 61 in the third example of the present invention.

The first primary containment unit 612 is composed of a fluorine resin with length L2 of 250 [mm], width of 250 [mm], and height L5 of 4.5 [mm]. The relative permittivity of the fluorine resin that forms the first primary containment unit 612 is 10.2, and the dielectric loss tangent is 0.0023.

Moreover, the first secondary containment unit 613 is composed of two fluorine resins with length L2 of 250 [mm], width of 250 [mm], and heights L4 and L9 of 6 [mm]. The relative permittivity constituting the first secondary containment unit 613 is 6.2, and the dielectric loss tangent is 0.0019.

The first tertiary containment unit 614 is composed of an acrylic material with length L1 of 260 [mm], width of 260 [mm], height L11 of 26.5 [mm], and thicknesses L3, L10, L12, and L13 of 5 [mm]. The relative permittivity of the acrylic material that forms the first tertiary containment unit 614 is 3.3, and the dielectric loss tangent is 0.04.

In FIG. 32, distance L6 is 1 [mm], distance L7 is 0.5 [mm], and distance L8 is 1 [mm]. In the present example, a simulation is performed in a setting where the power receiving device 62 is also of the same configuration as that of the power transmitting device 61 described above.

Figure 33:
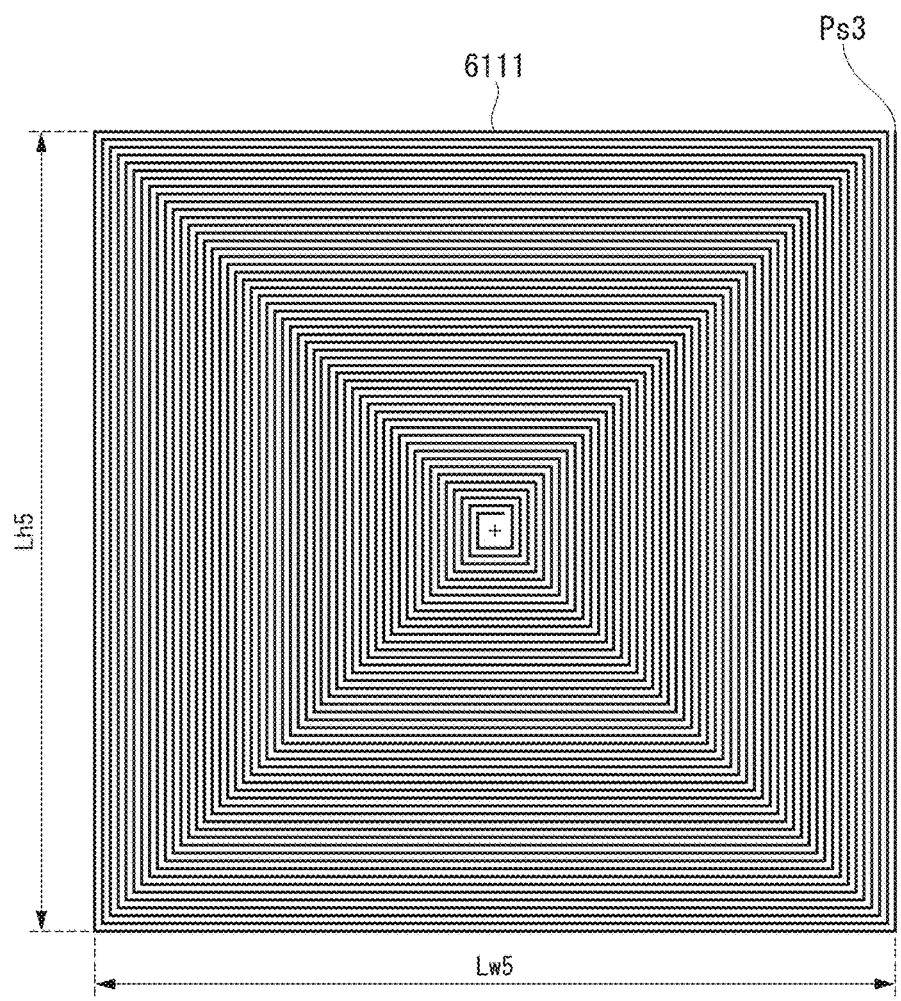
FIG. 33 is a diagram of a spiral coil of the power transmitting device in the third example of the present invention, viewed from the power receiving device side.

FIG. 33 is a diagram of the spiral coil 6111 of the power transmitting device 61 in the third example of the present invention, viewed from the power receiving device 62 side.

Figure 34:
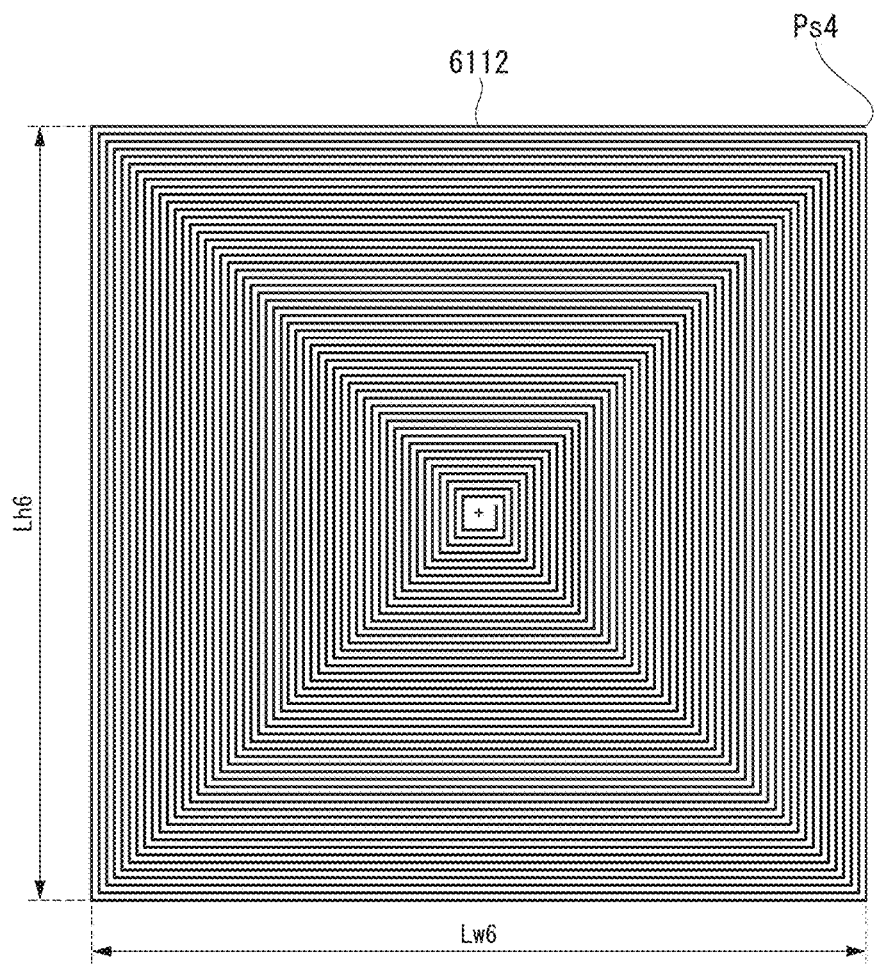
FIG. 34 is a diagram of the spiral coil of the power transmitting device in the third example of the present invention, viewed from the power receiving device side.

FIG. 34 is a diagram of the spiral coil 6112 of the power transmitting device 61 in the third example of the present invention, viewed from the power receiving device 62 side.

The spiral coil 6111 is configured with wiring composed of a 50-time wound conductor wire. Outer edge lengths Lh5 and Lw5 of the spiral coil 6111 are 208 [mm]. The diameter of the wiring of the spiral coil 6111 is 1 [mm], and intervals of the wires are 1 [mm].

The size of the spiral coil 6112 is set to the same size as the spiral coil 6111. The spiral coil 6111 and the spiral coil 6112 are disposed apart by 0.5 [mm] (L7). The outermost circumference end part of the spiral coil 6111 and the outermost circumference end part of the spiral coil 6112 serve as the power supply ports Ps3 and Ps4 for high frequency electric power. The orientation of the spiral of the spiral coil 6111 and the orientation of the spiral of the spiral coil 6112 are configured to be the orientations in which a magnetic field is generated in the same direction via the power supply ports Ps3 and Ps4.

Figure 35:
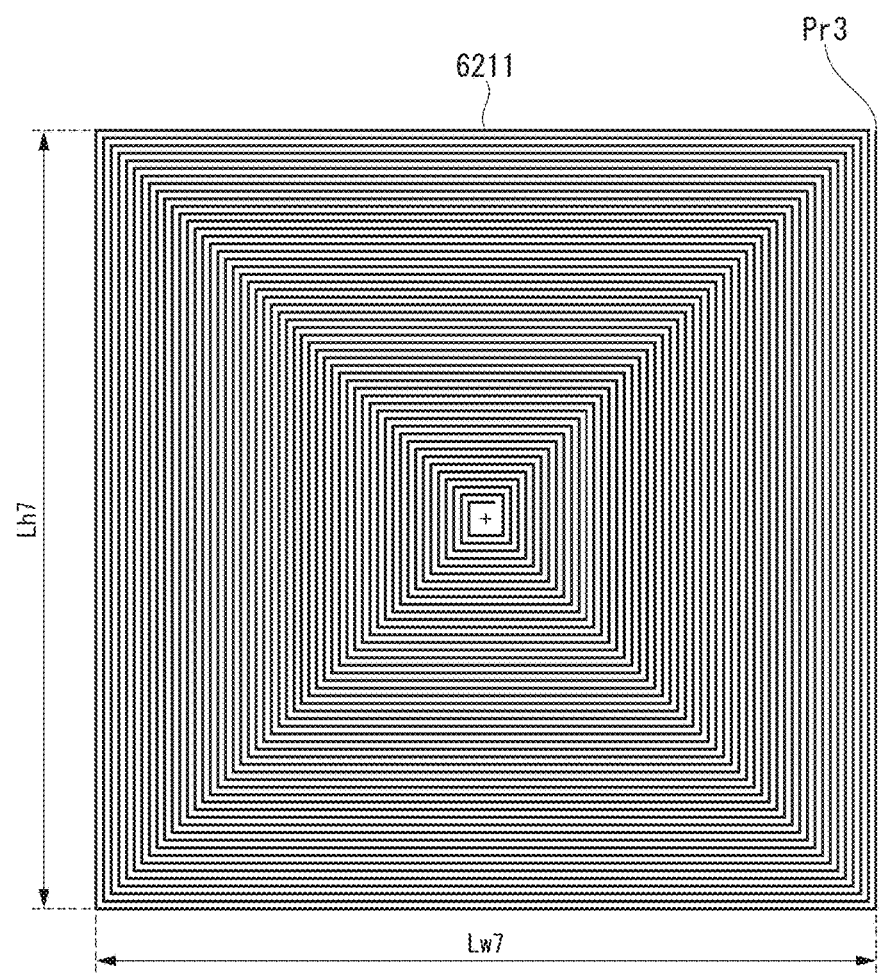
FIG. 35 is a diagram of a spiral coil of the power receiving device in the third example of the present invention, viewed from the power transmitting device side.

FIG. 35 is a diagram of the spiral coil 6211 of the power receiving device 62 in the third example of the present invention, viewed from the power transmitting device 61 side.

Figure 36:
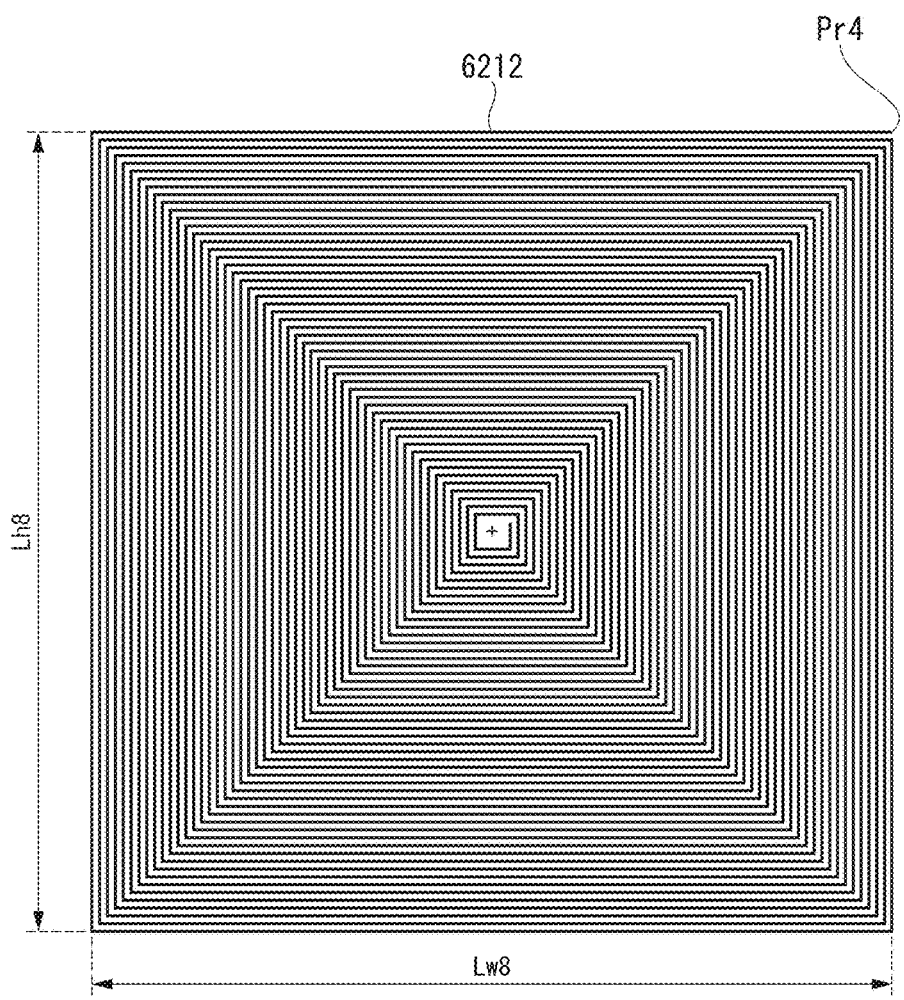
FIG. 36 is a diagram of the spiral coil of the power receiving device in the third example of the present invention, viewed from the power transmitting device side.

FIG. 36 is a diagram of the spiral coil 6212 of the power receiving device 62 in the third example of the present invention, viewed from the power transmitting device 61 side.

The spiral coil 6211 is configured with wiring composed of a 50-time wound conductor wire. Outer edge lengths Lh7 and Lw7 of the spiral coil 6211 are 208 [mm]. The diameter of the wiring of the spiral coil 6211 is 1 [mm], and intervals of the wires are 1 [mm].

The size of the spiral coil 6212 is set to the same size as the spiral coil 6211. The spiral coil 6211 and the spiral coil 6212 are disposed apart by 0.5 [mm]. The outermost periphery end part of the spiral coil 6211 and the outermost periphery end part of the spiral coil 6212 serve as the power receiving ports Pr3 and Pr4 for high frequency electric power. The orientation of the spiral of the spiral coil 6211 and the orientation of the spiral of the spiral coil 6212 are configured to be the orientations in which a magnetic field is generated in the same direction via the power receiving ports Pr3 and Pr4.

Figure 37:
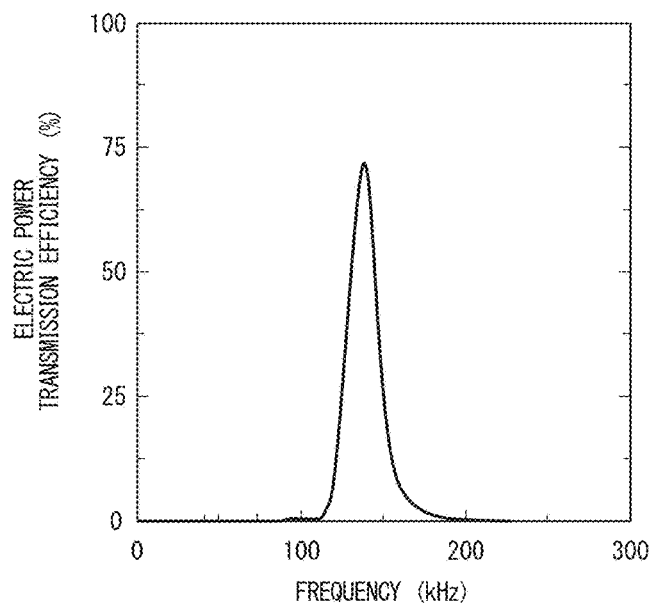
FIG. 37 is a diagram showing electric power transmission efficiency simulation results in the third example of the present invention.

FIG. 37 is a diagram showing electric power transmission efficiency simulation results in the third example of the present invention.

In the case where the power transmitting device 61 and the power receiving device 62 were apart by 10 [cm] in seawater, the electric power transmission efficiency simulation result was a high value of 72 [%] or more as shown in FIG. 37. The resonance frequency was approximately 140 [kHz].

The configuration of the power receiving device 62 in the present example was the same as that of the power transmitting device 61. However, the configuration shown here is merely an example, and the power transmitting device 61 and the power receiving device 62 need not be of the same configuration.

As shown in the simulation of the present example, by providing the configuration with several dielectric bodies for coating the coil, it is possible, without increasing loss in the dielectric bodies, to lower the frequency and achieve a high level of electric power transmission efficiency. As a result, a submarine can stably supply electric power to a sensor installed on the seafloor, in the seafloor soil, or in seawater. Moreover, in the power transfer system 5 of the present example, the first shielding body 616 and the second shielding body 626 shield against electromagnetic field leakage generated by the power transmitting device 61 and the power receiving device 62. As a result, it is possible to prevent malfunction or failure of the control circuit as a result of being influenced by the electromagnetic field leaked from the power transmitting device 61 and the power receiving device 62.

Fourth Example

Figure 38:
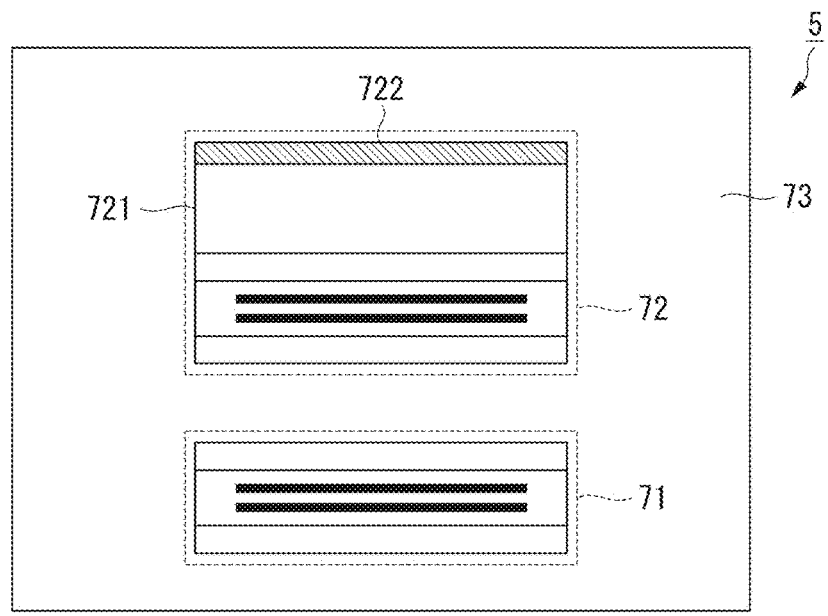
FIG. 38 is a diagram showing a simulation model for verifying the effect of the power transfer system according to the fifth exemplary embodiment of the present invention.

FIG. 38 is a diagram showing a simulation model for verifying the effect of the power transfer system 5 according to the fifth exemplary embodiment of the present invention.

Next is described a simulation that has verified the effect of the power transfer system 5 according to the fifth exemplary embodiment, that uses the simulation model of FIG. 38.

As shown in FIG. 38, the power transfer system 5 of the fifth exemplary embodiment includes a power transmitting device 71 and a power receiving device 72. The power transmitting device 71 is of the same structure as that of the power transmitting device 61 described in the third example. The power receiving device 72 is of the same structure as that of the power receiving device 62 described in the third example.

The power transmitting device 71 and the power receiving device 72 are covered by seawater 73 that serves as a good conductor medium. In the present example, only the power receiving device 72 includes a second back dielectric body 721, which is a dielectric body, and a second shielding body 722, which is a shielding body.

In the simulation model of the present example, the second back dielectric body 721 is composed of an acrylic material with height of 260 [mm], width of 260 [mm], and thickness of 0 to 200 [mm]. The relative permittivity of the acrylic material that forms the second back dielectric body 721 is 3.3, and the dielectric loss tangent is 0.04. The second shielding body 722 is composed of an aluminum material.

FIG. 39 is a diagram showing electric power transmission efficiency simulation results in the fourth example of the present invention.

In the case where the power transmitting device 51 and the power receiving device 52 were apart by 10 [cm] in seawater, as shown in FIG. 39, the electric power transmission efficiency simulation result was a high value of 72 [%] or more, as with the case of not providing the second shielding body 722, as a result of making the thickness of the second back dielectric body approximately 100 [mm] or more. The resonance frequency was approximately 140 [kHz]. A similar effect can be achieved also when the thickness of the second back dielectric body 721 is 100 [mm] or more.

In the present example, only the power receiving device 72 includes a second back dielectric body 721, which is a dielectric body, and a second shielding body 722, which is a shielding body. However, the configuration shown here is merely an example, and both the power transmitting device 71 and the power receiving device 72 may include a dielectric body and a shielding body.

In the present example, the simulation result in the case where the resonance frequency was 140 [kHz] is shown. However, this resonance frequency value is merely an example. When the resonance frequency differs from 140 [kHz], a thickness of the second back dielectric body 721 that does not influence transmission efficiency takes a value different from 100 [mm].

The invention of the present application has been described with reference to the exemplary embodiments and examples. However, the invention of the present application is not limited to the above exemplary embodiments and examples. As will be understood by those skilled in the art, various modifications may be made to the configuration and/or details of the invention without departing from the scope of the invention defined by the claims.

Part or all of the above exemplary embodiments may be stated in the following supplementary notes, however, they are not limited to the supplementary notes.

(Supplementary note 1) A power transfer system including a power transmitting device and a power receiving device that are opposed to each other via a medium, wherein the power transmitting device includes:

a transmission coil;

a first containment unit that includes a first surface opposed to the power receiving device and a second surface on an opposite side to the first surface, the first containment unit including a dielectric body that covers the transmission coil;

a first back dielectric body that is provided on the second surface of the first containment unit, the first back dielectric body including a first surface opposed to the first containment unit and a second surface on an opposite side to the first surface; and a first shielding body that is provided on the second surface of the first back dielectric body, the receiving device includes:

a receiving coil;

a second containment unit that includes a first surface opposed to the power transmitting device and a second surface on an opposite side to the first surface, the second containment unit including a dielectric body that covers the receiving coil;

a second back dielectric body that is provided on the second surface of the second containment unit, the second back dielectric body including a first surface opposed to the second containment unit and a second surface on an opposite side to the first surface; and a second shielding body that is provided on the second surface of the second back dielectric body, and the power transmitting device transmits electric power at a resonance frequency that is determined by an impedance of an electric power transmission path including the power transmitting device, the power receiving device, and the medium.

(Supplementary note 2) The power transfer system according to supplementary note 1, wherein in a case where a capacitance component that forms an impedance of the power transmitting device is expressed as C1, a capacitance component that forms an impedance of the power receiving device is expressed as C2, a capacitance component of a capacitance formed by the power transmitting device, the power receiving device, and the medium is expressed as C3, and a distance between the power transmitting device and the power receiving device is expressed as d, a relationship 30 cm>C3×d/(C1+C2)>0.5 cm is satisfied.

(Supplementary note 3) The power transfer system according to supplementary note 1 or 2, wherein the power transmitting device further includes an impedance adjustment unit that is configured to vary an impedance of the power transmitting device.

(Supplementary note 4) The power transfer system according to any one of supplementary notes 1 to 3, wherein the power receiving device further includes an impedance adjustment unit that is configured to vary an impedance of the power receiving device.

(Supplementary note 5) The power transfer system according to supplementary note 1 or 2, wherein the power transmitting device further includes a first impedance adjustment unit that is configured to vary an impedance of the power transmitting device, the power receiving device further includes a second impedance adjustment unit that is configured to vary an impedance of the power receiving device, and in a case where a combined capacitance component of a capacitance component forming the impedance of the power transmitting device and a capacitance component of the first impedance adjustment unit is expressed as C10, a combined capacitance component of a capacitance component forming the impedance of the power receiving device and a capacitance component of the second impedance adjustment unit is expressed as C20, a capacitance component of a capacitance formed by the power transmitting device, the power receiving device, and the medium is expressed as C3, and a distance between the power transmitting device and the power receiving device is expressed as d, the first impedance adjustment unit adjusts the impedance so as to satisfy a relationship 30 cm>C3×d/(C10+C20)>0.5 cm.

(Supplementary note 6) The power transfer system according to supplementary note 1 or 2, wherein the power transmitting device further includes a first impedance adjustment unit that is configured to vary an impedance of the power transmitting device, the power receiving device further includes a second impedance adjustment unit that is configured to vary an impedance of the power receiving device, and in a case where a combined capacitance component of a capacitance component forming the impedance of the power transmitting device and a capacitance component of the first impedance adjustment unit is expressed as C10, a combined capacitance component of a capacitance component forming the impedance of the power receiving device and a capacitance component of the second impedance adjustment unit is expressed as C20, and a distance between the power transmitting device and the power receiving device is expressed as d, the second impedance adjustment unit adjusts the impedance so as to satisfy a relationship 30 cm>C3×d/(C10+C20)>0.5 cm.

(Supplementary note 7) The power transfer system according to any one of supplementary notes 1 to 7, wherein a ratio of a size of the first containment unit in a direction along a coil surface to an outer diameter of the transmission coil is greater than 1.2.

(Supplementary note 8) The power transfer system according to any one of supplementary notes 1 to 7, wherein a ratio of a size of the first containment unit in a direction along a coil surface to an outer diameter of the receiving coil is greater than 1.2.

(Supplementary note 9) The power transfer system according to any one of supplementary notes 1 to 8, wherein the first containment unit includes:

a first containment unit that includes a first dielectric body that covers the transmission coil; and a first secondary containment unit that includes a second dielectric body that covers the first primary containment unit, and the second containment unit includes:

a second secondary containment unit that includes a first dielectric body that covers the receiving coil; and a second secondary containment unit that includes a second dielectric body that covers the first secondary containment unit.

(Supplementary note 10) The power transfer system according to supplementary note 9, wherein the first containment unit includes a coating dielectric body that includes a dielectric body that covers the first secondary containment unit, and the second containment unit includes a coating dielectric body that includes a dielectric body that covers the second secondary containment unit.

(Supplementary note 11) The power transfer system according to either one of supplementary notes 9 and 10, wherein the second dielectric body is composed of a dielectric body having a specific gravity equal to that of the medium.

(Supplementary note 12) The power transfer system according to any one of supplementary notes 9 to 11, wherein a dielectric loss tangent of the first dielectric body is lower than or equal to a dielectric loss tangent of the second dielectric body.

(Supplementary note 13) The power transfer system according to any one of supplementary notes 9 to 12, wherein a relative permittivity of the first dielectric body is lower than or equal to a relative permittivity of the second dielectric body.

(Supplementary note 14) The power transfer system according to any one of supplementary notes 1 to 13, wherein the electric conductivity of the medium is higher than $1\times10^{-4}$, and the relative permittivity of the medium is higher than 1.

(Supplementary note 15) The power transfer system according to any one of supplementary notes 1 to 14, wherein the medium includes at least one of seawater, river water, fresh water, tap water, soil, and concrete.

(Supplementary note 16) The power transfer system according to any one of supplementary notes 1 to 15, wherein at least a part of an electric field generated in the medium is rotating substantially parallel with a coil surface of the transmission coil or a coil surface of the receiving coil, and at least a part of a magnetic field generated in the medium is oriented substantially parallel with the coil surface of the transmission coil or the coil surface of the receiving coil.

(Supplementary note 17) The power transfer system according to supplementary note 16, wherein an interlinkage magnetic flux passing through the transmission coil and an interlinkage magnetic flux passing through the receiving coil are facing mutually opposite directions under a phase condition where magnetic field becomes a maximum, and thereby, a magnetic field parallel with the coil surface of the transmission coil and the coil surface of the receiving coil is generated.

(Supplementary note 18) The power transfer system according to any one of supplementary notes 1 to 17, wherein the power transmitting device is installed in a power supply source installed in seawater, a marine vessel, or a submarine, the power receiving device is installed in a power supply source installed in seawater, a marine vessel, or a submarine, and electric power is transmitted wirelessly from the power transmitting device to the power receiving device.

(Supplementary note 19) The power transfer system according to any one of supplementary notes 1 to 18, wherein the power transmitting device is installed in a connection unit of one of two power cables laid in seawater, the power receiving device is installed in a connection unit of the other power cable, and electric power is transmitted wirelessly from the power transmitting device to the power receiving device.

(Supplementary note 20) The power transfer system according to any one of supplementary notes 1 to 19, wherein by using the power transmitting device as a transmitter for information transmission, and using the power receiving device as a receiver for information transmission, electric power transmission and wireless communication are performed simultaneously.

(Supplementary note 21) A power transmitting device that is opposed to a power receiving device via a medium, the power transmitting device including:

a transmission coil;

a containment unit that includes a first surface opposed to the power receiving device and a second surface on an opposite side to the first surface, the containment unit including a dielectric body that covers the transmission coil;

a back dielectric body that is provided on the second surface of the containment unit, the back dielectric body including a first surface opposed to the containment unit and a second surface on an opposite side to the first surface; and a shielding body that is provided on the second surface of the back dielectric body.

(Supplementary note 22) A power receiving device that is opposed to a power transmitting device via a medium, the power receiving device including:

a receiving coil;

a containment unit that includes a first surface opposed to the power transmitting device and a second surface on an opposite side to the first surface, the containment unit including a dielectric body that covers the receiving coil;

a back dielectric body that is provided on the second surface of the containment unit, the back dielectric body including a first surface opposed to the containment unit and a second surface on an opposite side to the first surface; and a shielding body that is provided on the second surface of the back dielectric body.

(Supplementary note 23) A power transfer method for a power transfer system, the power transfer system including a power transmitting device and a power receiving device that are opposed to each other via a medium, the power transfer method comprising:

preparing a power transmitting device including a transmission coil, a first containment unit, a first back dielectric body and a first shielding body, the first containment unit including a first surface opposed to the power receiving device and a second surface on an opposite side to the first surface, the first containment unit including a dielectric body that covers the transmission coil, the first back dielectric body being provided on the second surface of the first containment unit, the first back dielectric body including a first surface opposed to the first containment unit and a second surface on an opposite side to the first surface, the first shielding body being provided on the second surface of the first back dielectric body;

preparing a power receiving device including a receiving coil, a second containment unit, a second back dielectric body and a second shielding body, the second containment unit including a first surface opposed to the power transmitting device and a second surface on an opposite side to the first surface, the second containment unit including a dielectric body that covers the receiving coil, the second back dielectric body being provided on the second surface of the second containment unit, the second back dielectric body including a first surface opposed to the second containment unit and a second surface on an opposite side to the first surface, the second shielding body being provided on the second surface of the second back dielectric body; and transmitting electric power at a resonance frequency that is determined by an impedance of an electric power transmission path including the power transmitting device, the power receiving device, and the medium.

(Supplementary note 24) A power transfer method for a power transmitting device, the power transmitting device being opposed to a power receiving device via a medium, the power transfer method including:

preparing a power transmitting device including a transmission coil, a containment unit, a back dielectric body and a shielding body, the containment unit including a first surface opposed to the power receiving device and a second surface on an opposite side to the first surface, the containment unit including a dielectric body that covers the transmission coil, the back dielectric body being provided on the second surface of the containment unit, the back dielectric body including a first surface opposed to the containment unit and a second surface on an opposite side to the first surface, the shielding body being provided on the second surface of the back dielectric body; and transmitting electric power at a resonance frequency that is determined by an impedance of an electric power transmission path including the power transmitting device, the power receiving device, and the medium.

(Supplementary note 25) A power transfer method for a power receiving device, the power receiving device being opposed to a power transmitting device via a medium, the power transfer method including:

preparing a receiving coil, a containment unit, a back dielectric body and a shielding body, the containment unit including a first surface opposed to the power transmitting device and a second surface on an opposite side to the first surface, the containment unit including a dielectric body that covers the receiving coil, the back dielectric body being provided on the second surface of the containment unit, the back dielectric body including a first surface opposed to the containment unit and a second surface on an opposite side to the first surface, the shielding body being provided on the second surface of the back dielectric body; and receiving electric power at a resonance frequency that is determined by an impedance of an electric power transmission path including the power transmitting device, the power receiving device, and the medium.

Priority is claimed on Japanese Patent Application No. 2013-103062, filed May 15, 2013, the contents of which are incorporated herein by reference. This application is based upon and claims the benefit of priority from Japanese patent application No. 2013-103062, filed on May 15, 2013, the disclosure of which is incorporated herein in its entirety by reference.

INDUSTRIAL APPLICABILITY

The present invention may be applied to a power transfer system, a power transmitting device, a power receiving device, and a power transfer method.

REFERENCE SYMBOLS 1, 2, 3, 4, 5, 6, 7, 8 Power transfer system
11, 21, 31, 41, 51, 61, 71 Power transmitting device
12, 22, 32, 42, 52, 62, 72 Power receiving device
13, 23 Good conductor medium (medium)
14 Power supply source
15, 16, 17 Submarine
18, 19 Power cable
33 Good conductor medium (seawater)
43, 53, 63, 73 Seawater
111, 211, 311 Transmission side coil (first coil)
112 Transmission side containment unit (first containment unit)
113, 214, 315 Transmission side back dielectric body (first back dielectric body)
114, 215, 316, 416, 516, 616 First shielding body (first shielding body)
115 Transmission side impedance adjustment unit (first impedance adjustment unit)
121, 221, 321 Receiving side coil (second coil)
122 Receiving side containment unit (second containment unit)
123, 224, 325, 721 Receiving side back dielectric body (second back dielectric body)
124, 225, 326, 426, 526, 626, 722 Receiving side shielding body (second shielding body)
125 Receiving side impedance adjustment unit (second impedance adjustment unit)
212, 312, 612 First transmission side containment unit (first primary containment unit)
213, 313, 613 Second transmission side containment unit (first secondary containment unit)
222, 322, 622 First receiving side containment unit (second primary containment unit)
223, 323, 623 Second receiving side containment unit (second secondary containment unit)
314, 614 Third transmission side containment unit (first tertiary containment unit)
324, 624 Third receiving side containment unit (second tertiary containment unit)
411 Helical coil (transmission coil, first coil)
412, 512 Internal dielectric body (first transmission side containment unit, first primary containment unit)
413, 513 External dielectric body (second transmission side containment unit, first secondary containment unit)
414, 514 Coating dielectric body (third transmission side containment unit, first tertiary containment unit)
421 Helical coil (receiving coil, second coil)
422, 522 Internal dielectric body (first receiving side containment unit, second primary containment unit)
423, 523 External dielectric body (second receiving side containment unit, second secondary containment unit)
424, 524 Coating dielectric body (third receiving side containment unit, second tertiary containment unit)
5111, 5211, 6111, 6112, 6211, 6212 Spiral coil
5112, 5212 Loop coil
5113, 5115 Dielectric substrate
5114 Spiral wiring
5116 Loop wiring

What is claimed is:

1. A power transfer system comprising a power transmitting device and a power receiving device that are opposed to each other with sandwiching a medium therebetween, wherein the power transmitting device includes:
a transmission coil;
a first containment unit that includes a first surface opposed to the power receiving device and a second surface on an opposite side to the first surface, the first containment unit including a first dielectric body that covers the transmission coil and a second dielectric body that covers the first dielectric body, a dielectric loss tangent of the second dielectric body being greater than a dielectric loss tangent of the first dielectric body;
a first back dielectric body that is provided on the second surface of the first containment unit, the first back dielectric body including a first surface opposed to the first containment unit and a second surface on an opposite side to the first surface; and
a first shielding body that is provided on the second surface of the first back dielectric body,
the power receiving device includes:
a receiving coil;
a second containment unit that includes a first surface opposed to the power transmitting device and a second surface on an opposite side to the first surface, the second containment unit including a dielectric body that covers the receiving coil;

a second back dielectric body that is provided on the second surface of the second containment unit, the second back dielectric body including a first surface opposed to the second containment unit and a second surface on an opposite side to the first surface; and a second shielding body that is provided on the second surface of the second back dielectric body, and the power transmitting device transmits electric power at a resonance frequency that is determined by an impedance of an electric power transmission path including the power transmitting device, the power receiving device, and the medium.

2. The power transfer system according to claim 1, wherein the power transmitting device further includes an impedance adjustment unit that is configured to vary an impedance of the power transmitting device.

3. The power transfer system according to claim 1, wherein the power receiving device further includes an impedance adjustment unit that is configured to vary an impedance of the power receiving device.

4. The power transfer system according to claim 1, wherein the power transmitting device further includes a first impedance adjustment unit that is configured to vary an impedance of the power transmitting device, the power receiving device further includes a second impedance adjustment unit that is configured to vary an impedance of the power receiving device, and in a case where a combined capacitance component of a capacitance component forming the impedance of the power transmitting device and a capacitance component of the first impedance adjustment unit is expressed as C10, a combined capacitance component of a capacitance component forming the impedance of the power receiving device and a capacitance component of the second impedance adjustment unit is expressed as C20, a capacitance component of a capacitance formed by the power transmitting device, the power receiving device, and the medium is expressed as C3, and a distance between the power transmitting device and the power receiving device is expressed as d, the first impedance adjustment unit adjusts the impedance of the power transmitting device so as to satisfy a relationship 30 cm>C3×d/(C10+C20)>0.5 cm.

5. The power transfer system according to claim 1, wherein the power transmitting device further includes a first impedance adjustment unit that is configured to vary an impedance of the power transmitting device, the power receiving device further includes a second impedance adjustment unit that is configured to vary an impedance of the power receiving device, and in a case where a combined capacitance component of a capacitance component forming the impedance of the power transmitting device and a capacitance component of the first impedance adjustment unit is expressed as C10, a combined capacitance component of a capacitance component forming the impedance of the power receiving device and a capacitance component of the second impedance adjustment unit is expressed as C20, and a distance between the power transmitting device and the power receiving device is expressed as d, the second impedance adjustment unit adjusts the impedance of the power receiving device so as to satisfy a relationship 30 cm>C3×d/(C10+C20)>0.5 cm.

6. The power transfer system according to claim 1, wherein a ratio of a size of the first containment unit in a direction along a coil surface to an outer diameter of the transmission coil is greater than 1.2.

7. The power transfer system according to claim 1, wherein a ratio of a size of the first containment unit in a direction along a coil surface to an outer diameter of the receiving coil is greater than 1.2.

8. The power transfer system according to claim 1, wherein the dielectric body of the second containment unit is a third dielectric body that covers the receiving coil, and the second containment unit further includes a fourth dielectric body that covers the third dielectric body.

9. The power transfer system according to claim 8, wherein the first containment unit further includes a dielectric body that covers the second dielectric body, and the second containment unit further includes a dielectric body that covers the fourth dielectric body.

10. The power transfer system according to claim 1, wherein the second dielectric body has a specific gravity equal to a specific gravity of the medium.

11. The power transfer system according to claim 1, wherein a relative permittivity of the first dielectric body is lower than or equal to a relative permittivity of the second dielectric body.

12. The power transfer system according to claim 1, wherein electric conductivity of the medium is higher than 1×10-4 Siemens per meter, and a relative permittivity of the medium is higher than 1.

13. The power transfer system according to claim 1, wherein the medium includes at least one of seawater, river water, fresh water, tap water, soil, and concrete.

14. The power transfer system according to claim 1, wherein at least a part of an electric field generated in the medium rotates substantially parallel with a coil surface of the transmission coil or a coil surface of the receiving coil, and at least a part of a magnetic field generated in the medium is oriented substantially parallel with the coil surface of the transmission coil or the coil surface of the receiving coil.

15. The power transfer system according to claim 14, wherein an interlinkage magnetic flux passing through the transmission coil and an interlinkage magnetic flux passing through the receiving coil face mutually opposite directions under a phase condition where magnetic field becomes a maximum, and thereby, a magnetic field parallel with the coil surface of the transmission coil and the coil surface of the receiving coil is generated.

16. The power transfer system according to claim 1, wherein the power transmitting device is installed in a power supply source installed in seawater, a marine vessel, or a submarine, the power receiving device is installed in a power supply source installed in seawater, a marine vessel, or a submarine, and electric power is transmitted wirelessly from the power transmitting device to the power receiving device.

17. The power transfer system according to claim 1, wherein the power transmitting device is installed in a connection unit of one of two power cables laid in seawater, the power receiving device is installed in a connection unit of the other power cable of the two power cables, and electric power is transmitted wirelessly from the power transmitting device to the power receiving device.

18. The power transfer system according to claim 1, wherein by using the power transmitting device as a transmitter for information transmission, and using the power receiving device as a receiver for information transmission, electric power transmission and wireless communication are performed simultaneously.

19. A power transmitting device that is opposed to a power receiving device with sandwiching a medium therebetween, the power transmitting device comprising:
   a transmission coil;
   a containment unit that includes a first surface opposed to the power receiving device and a second surface on an opposite side to the first surface, the containment unit including a first dielectric body that covers the transmission coil and a second dielectric body that covers the first dielectric body, a dielectric loss tangent of the second dielectric body being greater than a dielectric loss tangent of the first dielectric body;
   a back dielectric body that is provided on the second surface of the containment unit, the back dielectric body including a first surface opposed to the containment unit and a second surface on an opposite side to the first surface; and
   a shielding body that is provided on the second surface of the back dielectric body.

20. A power transfer method for a power transfer system, the power transfer system including a power transmitting device and a power receiving device that are opposed to each other with sandwiching a medium therebetween, the power transfer method comprising:
   preparing a power transmitting device including a transmission coil, a first containment unit, a first back dielectric body and a first shielding body, the first containment unit including a first surface opposed to the power receiving device and a second surface on an opposite side to the first surface, the first containment unit including a first dielectric body that covers the transmission coil and a second dielectric body that covers the first dielectric body, a dielectric loss tangent of the second dielectric body being greater than a dielectric loss tangent of the first dielectric body, the first back dielectric body being provided on the second surface of the first containment unit, the first back dielectric body including a first surface opposed to the first containment unit and a second surface on an opposite side to the first surface, the first shielding body being provided on the second surface of the first back dielectric body;
   preparing a power receiving device including a receiving coil, a second containment unit, a second back dielectric body and a second shielding body, the second containment unit including a first surface opposed to the power transmitting device and a second surface on an opposite side to the first surface, the second containment unit including a dielectric body that covers the receiving coil, the second back dielectric body being provided on the second surface of the second containment unit, the second back dielectric body including a first surface opposed to the second containment unit and a second surface on an opposite side to the first surface, the second shielding body being provided on the second surface of the second back dielectric body; and
   transmitting electric power at a resonance frequency that is determined by an impedance of an electric power transmission path including the power transmitting device, the power receiving device, and the medium.

\* \* \* \* \*